(12) United States Patent
Yamamoto et al.

(10) Patent No.: US 9,280,729 B2
(45) Date of Patent: Mar. 8, 2016

(54) METHOD OF CREATING SAMPLE PAGE, PROGRAM, AND IMAGE FORMING SYSTEM

(71) Applicant: Konica Minolta, Inc., Chiyoda-ku (JP)

(72) Inventors: Tomoko Yamamoto, Machida (JP); Kazuto Yamamoto, Koganei (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/604,146

(22) Filed: Jan. 23, 2015

(65) Prior Publication Data

US 2015/0220819 A1 Aug. 6, 2015

(30) Foreign Application Priority Data

Jan. 31, 2014 (JP) ................................. 2014-017944
Feb. 5, 2014 (JP) ................................. 2014-020760

(51) Int. Cl.
| | |
|---|---|
| *H04N 1/60* | (2006.01) |
| *G06K 15/02* | (2006.01) |
| *B41J 29/393* | (2006.01) |
| *G03G 15/00* | (2006.01) |

(52) U.S. Cl.
CPC ............. *G06K 15/027* (2013.01); *B41J 29/393* (2013.01); *G03G 15/00* (2013.01); *H04N 1/60* (2013.01)

(58) Field of Classification Search
None
See application file for complete search history.

(56) References Cited

U.S. PATENT DOCUMENTS

| | | | | | |
|---|---|---|---|---|---|
| 7,557,958 | B2 * | 7/2009 | Yoshikawa | ........... | H04N 1/6011 358/2.1 |
| 7,839,540 | B2 * | 11/2010 | Nishide | .............. | H04N 1/00204 358/1.9 |
| 7,855,807 | B2 * | 12/2010 | Pepin | ....................... | H04N 1/54 345/592 |
| 7,872,785 | B2 * | 1/2011 | Lin | ..................... | H04N 1/6019 358/1.9 |
| 7,933,053 | B2 * | 4/2011 | Dalal | .................. | H04N 1/6058 358/1.6 |
| 8,040,560 | B2 * | 10/2011 | Albat | .................. | H04N 1/6027 358/1.9 |
| 8,149,251 | B2 * | 4/2012 | Gregory, Jr. | ......... | H04N 1/6033 345/204 |
| 2003/0214657 | A1 * | 11/2003 | Stringham | .............. | H04L 67/02 358/1.1 |
| 2008/0013134 | A1 * | 1/2008 | Nishide | .................. | G06K 15/02 358/518 |
| 2013/0088728 | A1 * | 4/2013 | Chen | ....................... | H04N 1/54 358/1.9 |

FOREIGN PATENT DOCUMENTS

| | | |
|---|---|---|
| JP | 2010-278494 A | 12/2010 |
| JP | 2012-228836 A | 11/2012 |

* cited by examiner

*Primary Examiner* — Paul F Payer
(74) *Attorney, Agent, or Firm* — Buchanan Ingersoll & Rooney PC

(57) ABSTRACT

A method of creating a sample page in an image system, the method includes: a step of holding a color measurement result of a colorimeter, with respect to an output image of a special color, as a history color measurement result; a step of determining whether a creation condition of the sample page is satisfied; and a step of creating the sample page having a first color sample image and a second color sample image formed on a recording medium, the first color sample image being according to printer device values calculated based on the history color measurement result of the special color, and the second color sample image being according to printer device values of the special color determined from a special color table, when the creation condition of the sample page is determined to be satisfied.

22 Claims, 28 Drawing Sheets

FIG. 3A
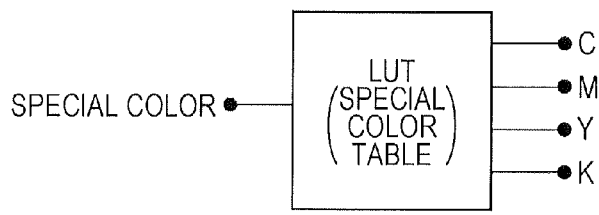
FIG. 3B
| SPECIAL COLOR | | PRINTER DEVICE VALUES | | | | ORIGINAL COLOR INFORMATION | | |
|---|---|---|---|---|---|---|---|---|
| ID | NAME OF SPECIAL COLOR | C | M | Y | K | $L^*$ | $a^*$ | $b^*$ |
| 001 | SPECIAL COLOR A | 1 | 93 | 96 | 1 | 57.5 | 72.5 | 61.7 |
| 002 | SPECIAL COLOR B | 92 | 0 | 64 | 3 | 59.0 | −74.8 | −0.4 |
| 003 | SPECIAL COLOR C | 79 | 16 | 1 | 0 | 59.5 | −17.2 | −45.1 |
| 004 | SPECIAL COLOR D | 91 | 97 | 0 | 7 | 20.9 | 50.2 | −59.3 |
| 005 | SPECIAL COLOR E | 0 | 75 | 97 | 1 | 63.5 | 61.7 | 81.9 |
| ... | ... | ... | ... | ... | ... | ... | ... | ... |
FIG. 4
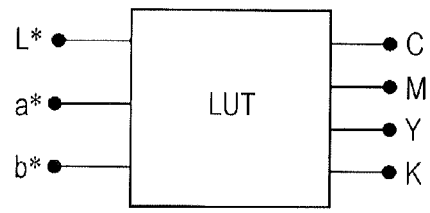

FIG. 7

| NAME | HISTORY INFORMATION | HISTORY INFORMATION |
|---|---|---|
| HISTORY ID | XXXX00003 | XXXX04999 |
| JOB NAME | #001 | #001 |
| PAGE | 3 | 4999 |
| DATE AND TIME | 201x/9/1 13:01 | 201x/9/3 16:00 |
| SPECIAL COLOR IDENTIFICATION INFORMATION | 003 (SPECIAL COLOR C) | 003 (SPECIAL COLOR C) |
| COLOR MEASUREMENT RESULT | L56.0, a−18.8, b−42.8 | L55.9, a−18.5, b−43.1 |
| COLOR DIFFERENCE (WITH RESPECT TO ORIGINAL) | ΔE 4.28 | ΔE 4.33 |
| PRINTER DEVICE VALUES | C79, M16, Y1, K0 | C79, M16, Y1, K0 |
| ARRANGEMENT POSITION (START POINT) | x1=180, Y1=10 | x1=180, Y1=10 |
| ARRANGEMENT POSITION (END POINT) | x2=200, Y2=30 | x2=200, Y2=30 |
| PRINTING SETTING | NORMAL PAPER | NORMAL PAPER |
| | PAPER SPEED Normal | PAPER SPEED Normal |
| | FIXING TEMPERATURE LOW | FIXING TEMPERATURE high |
| ENVIRONMENT INFORMATION | 30°C/70%RH | 25°C/50%RH |

FIG. 8

SPECIAL COLOR    SAMPLE PAGE CREATION CONDITION SETTING

Spot Color    8a        SAMPLE SETTING    8b                              CONDITION              8c SPECIAL COLOR A   ☑         NUMBER OF OUTPUT SHEETS                    EVERY 1,000 SHEETS  ▽
SPECIAL COLOR C   ☑         COLOR DIFFERENCE WITH RESPECT TO TARGET VALUE    ΔE ≥ 5         ▽
SPECIAL COLOR E   ☐                                                                         ▽
SPECIAL COLOR G   ☑         COLOR DIFFERENCE WITH RESPECT TO FIRST OUTPUT VALUE   ΔE ≥ 3    ▽
SPECIAL COLOR H   ☐                                                                         ▽

SAMPLE PRINTING LAYOUT                                OUTPUT SETTING
8d —☑ PAST OUTPUT SIMULATION                          SHEET DISCHARGE TRAY
8e —☑ OUTPUT ENVIRONMENT                                  SUB TRAY  ▽
8f —☐ PATCH FOR CORRECTION
8g —☐ HIGHLIGHTED DISPLAY OF CHANGE

OK              APPLY           CANCEL

FIG. 12

| PAGE ID | JOB # | PAGE | OUTPUT DATE AND TIME | SHEET | SIZE | COLOR MEASUREMENT | NAME OF SPECIAL COLOR | POSITION OF SPECIAL COLOR (START POINT) | POSITION OF SPECIAL COLOR (END POINT) | PRINTER DEVICE VALUES (CMYK VALUES) |
|---|---|---|---|---|---|---|---|---|---|---|
| XXX00001 | 001 | 1 | 9/1 | Plain | A4 | Off | — | — | — | — |
| XXX00002 | | 2 | 9/1 | Plain | A4 | Off | — | — | — | — |
| XXX00003 | | 3 | 9/1 | Plain | A4 | On | SPECIAL COLOR C | X1=180, Y1=10 | X2=200, Y2=30 | C79, M16, Y1, K0 |
| XXX00004 | | 4 | 9/1 | Plain | A4 | Off | — | — | — | — |
| ⋮ | | | | | | | | | | |
| XXX04998 | | 4998 | 9/3 | Plain | A4 | Off | — | — | — | — |
| XXX04999 | | 4999 | 9/3 | Plain | A4 | Off | SPECIAL COLOR C | X1=2, Y1=30 | X2=20, Y2=45 | C79, M16, Y1, K0 |
| ⋮ | | | | | | | | | | |
| XXX09997 | | 9997 | 9/5 | Plain | A4 | Off | — | — | — | — |
| XXX09998 | | 9998 | 9/5 | Plain | A4 | On | SPECIAL COLOR C | X1=2, Y1=30 | X2=20, Y2=45 | C79, M16, Y1, K0 |
| XXX09999 | | 9999 | 9/5 | Plain | A4 | Off | — | — | — | — |
| XXX10000 | | 10000 | 9/5 | Plain | A4 | Off | — | — | — | — |

FIG. 14

| SPECIAL COLOR | ORIGINAL COLOR INFORMATION | LATEST PRINTER DEVICE VALUES | COLOR MEASUREMENT HISTORY ID 1 | COLOR MEASUREMENT HISTORY ID 2 | COLOR MEASUREMENT HISTORY ID 3 |
|---|---|---|---|---|---|
| SPECIAL COLOR A | L57.5, a72.5, b61.7 | C1, M93, Y96, K1 | XXX00027 | XXX00998 | XXX07654 |
| SPECIAL COLOR B | L59.8, a-74.8, b-0.4 | C92, M0, Y64, K3 | | | |
| SPECIAL COLOR C | L59.5, a-17.2, b-45.1 | C79, M16, Y1, K0 | XXX00003 | XXX04999 | XXX09998 |
| SPECIAL COLOR D | L20.9, a50.2, b-59.3 | C91, M97, Y0, K7 | | | |
| SPECIAL COLOR E | L63.5, a61.7, b81.9 | C0, M75, Y97, K1 | | | |
| | | | | | |

FIG. 15

| ID | HISTORY | | | | CURRENT LUT APPLICATION (FIRST COLOR) (SAMPLE IMAGE) |
|---|---|---|---|---|---|
| | DATE AND TIME | NAME OF SPECIAL COLOR | PRINTER DEVICE VALUES | COLOR MEASUREMENT RESULT | PRINTER DEVICE VALUES FOR SIMULATION |
| XXX00003 | 9/1 | SPECIAL COLOR C | C79,M16,Y1,K0 | L56,a-17.8,b-42.7 | C76,M17,Y1,K0 |
| ... | | | | | |
| XXX04999 | 9/3 | SPECIAL COLOR C | C79,M16,Y1,K0 | L55.9,a-18.5,b-43.1 | C77,M16,Y1,K0 |
| ... | | | | | |
| XXX09998 | 9/5 | SPECIAL COLOR C | C79,M16,Y1,K0 | L54.6,a-17.8,b-43.7 | C79,M16,Y1,K0 |
| | | | | | |

FIG. 16

Spot Color  92  201x/09/05

SPECIAL COLOR C  L*54.6, a*-17.8, b*-43.7  ΔE5.1

C79, M16, Y1, K0  Original Lab: L59.5, a-17.2, b-45.1

| | | 91a | 91b | 91c |
|---|---|---|---|---|
| | COLOR SAMPLE | ● | ● | ● |
| 95 | PRINTER DEVICE VALUES FOR SIMULATION | C76 M17 Y1 K0 | C77 M16 Y1 K0 | C79 M16 Y1 K0 |
| HISTORY | OUTPUT INFORMATION | 9/1 | 9/3 | 9/5 |
| | MEASUREMENT RESULT | L 56, a -17.8 b -42.7 ΔE4.28 | L 55.9 a -18.5 b -43.1 ΔE4.33 | L 54.6 a -17.8 b -43.7 ΔE 5.1 |
| | PRINTER DEVICE VALUES | C79 M16 Y1 K0 | C79, M16 Y1 K0 | C79 M16 Y1 K0 |

Spot Color    92

SPECIAL COLOR C    L*54.6, a*-17.8, b*-43.7   ΔE5.1

C79, M16, Y1, K0     Original Lab: L59.5, a-17.2, b-45.1

NORMAL PAPER SPEED  Normal
FIXING TEMPERATURE  High
ROOM ENVIRONMENT  20°C 50%RH

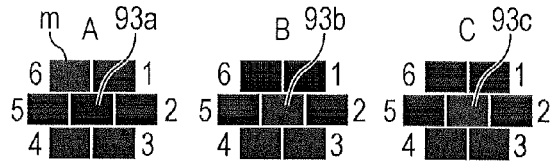

| | A 93a | B 93b | C 93c |
|---|---|---|---|
| PRINTER DEVICE VALUES FOR SIMULATION (CENTER PATCH) | C76<br>M17<br>Y1<br>K0 | C77<br>M16<br>Y1<br>K0 | C79<br>M16<br>Y1<br>K0 |
| OUTPUT INFORMATION | 9/1 | 9/3 | 9/5 |
| COLOR MEASUREMENT RESULT | L56<br>a-17.8<br>b-42.7<br>ΔE4.28 | L55.<br>a-18.5<br>b-43.1<br>ΔE4.33 | L54.6<br>a-17.8<br>b-43.7<br>ΔE 5.1 |
| PRINTER DEVICE VALUES | C79<br>M16<br>Y1<br>K0 | C79<br>M16<br>Y1<br>K0 | C79<br>M16<br>Y1<br>K0 |
| NORMAL PAPER SPEED | Normal | Normal | High |
| FIXING TEMPERATURE | Low | High | High |
| ROOM ENVIRONMENT | 28°C 70%RH | 20°C 50%RH | 20°C 50%RH |

99a, 99b, 99c, 99d

FIG. 20
| SPECIAL COLOR | | PRINTER DEVICE VALUES | | | |
|---|---|---|---|---|---|
| ID | NAME OF SPECIAL COLOR | C | M | Y | K |
| 001 | SPECIAL COLOR A | 1 | 94 | 84 | 1 |
| 003 | SPECIAL COLOR C | 99 | 26 | 5 | 9 |
| 005 | SPECIAL COLOR E | 1 | 76 | 96 | 1 |
| 007 | SPECIAL COLOR G | 1 | 25 | 96 | 1 |
| 008 | SPECIAL COLOR H | 96 | 2 | 55 | 1 |
| ... | ... | ... | ... | ... | ... |
FIG. 21A
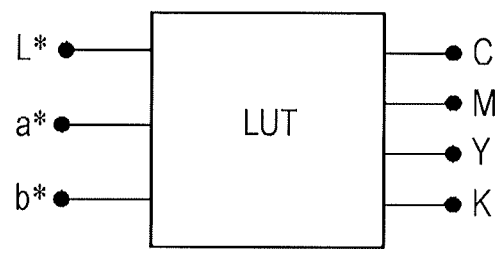
FIG. 21B
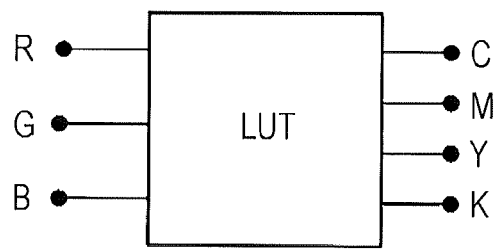

FIG. 22

| STORAGE TRAY | SHEET TYPE | COLOR INFORMATION ||
| --- | --- | --- | --- |
| | | Lab VALUES | CMYK VALUES |
| TRAY 1 | NORMAL PAPER 1 | L91.8, a−0.5, b1.4 | C1, M2, Y5, K0 |
| TRAY 2 | CARDBOARD 1 | L91.8, a−0.5, b1.4 | C0, M1, Y8, K0 |
| TRAY 3 | CARDBOARD 2 | L91, a−4, b25 | C11, M9, Y36, K0 |
| ... | ... | ... | ... |

FIG. 27

| PAGE ID | JOB # | PAGE | SHEET | SIZE | COLOR MEASUREMENT | NAME OF SPECIAL COLOR | POSITION OF SPECIAL COLOR (START POINT) | POSITION OF SPECIAL COLOR (END POINT) | PRINTER DEVICE VALUES (CMYK VALUES) |
|---|---|---|---|---|---|---|---|---|---|
| XXX00001 | 001 | 1 | Paper1 | A4 | On | SPECIAL COLOR A | X1=180, Y1=10 | X2=200, Y2=30 | C1, M94, Y84, K1 |
| XXX00002 | | 2 | Paper1 | A4 | Off | — | — | — | — |
| XXX00003 | | 3 | Paper1 | A4 | On | SPECIAL COLOR A | X1=180, Y1=10 | X2=200, Y2=30 | C1, M94, Y84, K1 |
| XXX00004 | | 4 | Paper1 | A4 | Off | — | — | — | — |
| ... | | | | | | | | | |
| XXX09997 | | 9997 | Paper2 | A4 | On | SPECIAL COLOR C | X1=2, Y1=30 | X2=20, Y2=45 | C99, M26, Y5, K9 |
| XXX09998 | | 9998 | Paper2 | A4 | Off | SPECIAL COLOR E | X1=2, Y1=30 | X2=20, Y2=45 | C1, M76, Y96, K1 |
| XXX09999 | | 9999 | Paper2 | A4 | On | SPECIAL COLOR G | X1=2, Y1=30 | X2=20, Y2=45 | C1, M25, Y96, K1 |
| XXX10000 | | 10000 | Paper2 | A4 | Off | SPECIAL COLOR H | X1=13, Y1=5 | X2=20, Y2=12 | C96, M2, Y55, K1 |

FIG. 29

| PAGE | COLOR MEASUREMENT OBJECT | COLOR MEASUREMENT POSITION (START POINT) | COLOR MEASUREMENT POSITION (END POINT) | Lab | CMYK |
|---|---|---|---|---|---|
| 1 | SPECIAL COLOR A | X1=180, Y1=10 | X2=200, Y2=30 | L64.1, a82.9, b-10.91 | C1, M96, Y99, K1 |
| 1 | Paper 1 | X1=180, Y1=50 | X2=200, Y2=70 | L91.8, a-0.5, b1.4 | C1, M2, Y5, K0 |
| 3 | SPECIAL COLOR A | X1=180, Y1=10 | X2=200, Y2=30 | L64.1, a83.9, b-10.81 | C2, M82.5, Y100, K0 |
| 3 | Paper 1 | X1=180, Y1=50 | X2=200, Y2=70 | L92.7, a-1.2, b4.8 | C0, M1, Y8, K0 |

METHOD OF CREATING SAMPLE PAGE, PROGRAM, AND IMAGE FORMING SYSTEM

The entire disclosures of Japanese Patent Application No. 2014-017944 filed on Jan. 31, 2014 and No. 2014-020760 filed on Feb. 5, 2014 including description, claims, drawings, and abstract are incorporated herein by reference in its entirety.

BACKGROUND OF THE INVENTION

1. Field of the Invention

The present invention relates to a method of creating a sample page, a program, and an image forming system.

2. Description of the Related Art

In the printing field, there are colors that require accurate color reproducibility, such as a corporate color used for a logo of a company. Such a color is reproduced by using a specially mixed dedicated ink in offset printing (hereinafter, the color is referred to as "special color (spot color)").

Meanwhile, in the printing market where image forming devices in an offset printing system are often used, a case of using an image forming device in an electrophotographic system or an image forming device in an ink jet system has been increasing.

In the image forming device in an electrophotographic system, printing is performed using a dedicated library (spot color library) in which reproduction of the special color is approximated by a combination of toners of C, M, Y, and K basic colors (for example, JP 2010-278494 A).

Further, the image forming device in an electrophotographic system reproduces the special color with the combination of the toners of the basic colors as described above, output results vary due to various causes such as a difference between the devices or a variation of change of the devices. Therefore, patch images generated with different amounts of toners with different signal strengths are formed, the density and the color information are manually measured, and the patch images are visually compared with a color guide, so that C, M, Y, and K values (printer device values) of the spot color library are edited, and color adjustment is performed.

Stability of the color reproduction is important and is strictly managed with respect to the special color. In variable printing in which mass printing is performed, there is a problem that the color is being changed as a large number of sheets of printing is performed, even if the color adjustment is performed before the mass printing is started. In such a case, when a change amount exceeds a threshold, readjustment of the special color is performed.

At this time, the color adjustment may be performed by referring to a past output and taking the past output as a landmark. However, there is a problem that, to use the past output, extraction of a printed portion of the special color from the mass printed sheets is required, and a lot of labor is required to perform determination related to the readjustment and the determination is not so easy.

Further, in the printing market, handling of a wide variety of sheets is required, and handling of not only white papers but also papers with a color (colored papers) is required.

Between a case of using a white paper and a case of using a colored paper other than white, even if the same special color is output, the colors (color measurement values) are changed due to influence of a background paper. Further, due to an illusion, even if images having the same color measurement value are formed, the images may sometimes be viewed with different colors due to the difference of the background colors. For example, it is known that a color arranged in a dark background color is recognized brighter than a color arranged in a bright background color due to an illusion, and when the background color is vivid yellow, a color arranged in the yellow is seen as a bluish color that is at a complementary color side of the background color, due to an illusion.

JP 2012-228836 A discloses that, in a printing device in an ink jet system, a color chart is printed, the color chart being formed such that a plurality of blocks made of a plurality of color patches is arranged in a main scanning direction, then a colorimeter is temporarily attached to the printing device and color measurement is performed, and then a color difference ($\Delta E$) between a color measurement result of each block and a block serving as a reference, and a color difference between the color measurement result of each block and a past output result are printed in the vicinity of each color patch.

Although the printing device described in JP 2012-228836 A can compare the color differences, the printing device cannot visually compare an actual image with the past color as to how the actual image is changed from the past color, with respect to the special color that requires strict management.

Further, the printing device described in JP 2012-228836 A cannot confirm an actual output, with respect to the special color that requires strict management.

Further, when managing the special color, there is a case of desiring confirmation of the output image of the special color or color adjustment of the special color in consideration of the influence of the difference of the colors of the background sheets.

SUMMARY OF THE INVENTION

An object of the present invention is to provide a method of creating a sample page that can easily output a sample page that enables visual comparison of the special color, in order to overcome such problems. Further, an object of the present invention is to provide a method of creating a sample page that can easily output a sample page that enables comparison determination of the special color, in consideration of the difference of the colors of sheets used for printing.

1. To achieve at least one of the abovementioned objects, according to an aspect, a method of creating a sample page in an image system including a special color setting unit configured to determine whether a special color is included in print data, and to set printer device values of the special color using a special color table in which identification information of the special color and printer device values indicating density signals of basic colors are associated when the special color is included in the print data, an image forming unit configured to form a color image on a recording medium based on the printer device values, a colorimeter configured to perform color measurement of an output image formed on the recording medium by the image forming unit to acquire color information, and a color conversion unit configured to calculate the printer device values indicating density signals of basic colors from the color information, the method reflecting one aspect of the present invention comprises: a step of holding a color measurement result of the colorimeter, with respect to the output image of the special color, as a history color measurement result; a step of determining whether a creation condition of the sample page is satisfied; and a step of creating the sample page having a first color sample image and a second color sample image formed on the recording medium, the first color sample image being according to the printer device values calculated based on the history color measurement result of the special color, and the second color sample image being according to the printer device values of the special color determined from the special color table, when the creation condition of the sample page is determined to be satisfied.

2. The method of creating a sample page according to Item. 1, wherein, on the sample page, the history color measurement result of the special color, and a color difference between the history color measurement result and original, color information of the special color are preferably indicated, with respect to the first color sample image.

3. The method of creating a sample page according to Item. 1 or 2, wherein, on the sample page, estimated color information with respect to the second color sample image, and a color difference between the estimated color information and original color information of the special color are preferably indicated, with respect to the second color sample image.

4. The method of creating a sample page according to any one of Items. 1 to 3, wherein the step of holding a history further preferably holds the printer device values applied to the output image subjected to the color measurement, and on the sample page, the held printer device values are preferably indicated, with respect to the first color sample image, and the printer device values applied to the second color sample image are preferably indicated, with respect to the second color sample image.

5. The method of creating a sample page according to any one of Items. 1 to 4, wherein the color conversion unit preferably includes a look up table used when calculating the printer device values based on the color information, and the method preferably includes a step of updating the look up table after executing the step of holding a history and before executing the step of creating the sample page, and in the step of creating the sample page, the color conversion unit preferably determines the printer device values of the first color sample image using the updated look up table.

6. The method of creating a sample page according to any one of items. 1 to 4, wherein the method preferably includes a step of outputting a plurality of patch images having differentiated printer device values, for reproduction of the history color measurement result, and acquiring a corresponding relationship between the printer device values and the color information from a color measurement result of the outputted patch images, after executing the step of holding a history, and before executing the step of creating the sample page, and in the step of creating the sample page, the color conversion unit preferably determines the printer device values of the first color sample image from the acquired corresponding relationship.

7. The method of creating a sample page according to any one of Items. 1 to 6, wherein the creation condition of the sample page is preferably at least one of (1) every time a predetermined number of sheets printed is exceeded, (2) when a color difference between original color information of the special color and the output image of the special color exceeds a predetermined value, and (3) when a color difference between the history color measurement result and the output image of the special color exceeds a predetermined value.

8. The method of creating a sample page according to Item. 7, wherein, when one print job including an output of the special color is executed, the creation condition of the sample page is preferably further intended for the sample print job, and the history color measurement result is a result of the color measurement with respect to the output image of a first special color in the print job.

9. The method of creating a sample page according to any one of Items. 1 to 8, wherein the step of holding a history further preferably holds an output condition of at least either one of printing setting of a print, and ambient temperature and humidity at a time of the print, and on the sample page, the held output condition is indicated, with respect to the first color sample image.

10. The method of creating a sample page according to any one of Items. 1 to 9, wherein original color information of the special color is preferably outside a color gamut that the image forming unit is able to reproduce with the color image formed on the recording medium.

11. To achieve at least one of the abovementioned objects, according to an aspect, a non-transitory recording medium storing a computer readable program for causing an image system to create a sample page, the image system including a special color setting unit configured to determine whether a special color is included in print data, and to set printer device values of the special color using a special color table in which identification information of the special color and printer device values indicating density signals of basic colors are associated when the special color is included in the print data, an image forming unit configured to form a color image on a recording medium based on the printer device values, a colorimeter configured to perform color measurement of an output image formed on the recording medium by the image forming unit to acquire color information, and a color conversion unit configured to calculate the printer device values indicating density signals of basic colors from the color information, the program, reflecting one aspect of the present invention, for causing a computer to execute: a step of holding a color measurement result of the colorimeter, with respect to the output image of the special color, as a history color measurement result; a step of determining whether a creation condition of the sample page is satisfied; and a step of creating the sample page having a first color sample image and a second color sample image formed on the recording medium, the first color sample image being according to the printer device values calculated based on the history color measurement result of the special color, and the second color sample image being according to the printer device values of the special color determined from the special color table, when the creation condition of the sample page is determined to be satisfied.

12. The non-transitory recording medium storing a computer readable program according to Item. 11, wherein, on the sample page, the history color measurement result of the special color, and a color difference between the history color measurement result and original color information of the special color are preferably indicated, with respect to the first color sample image.

13. To achieve at least one of the abovementioned objects, according to an aspect, a method of creating a sample page in an image forming system including: a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the method reflecting one aspect of the present invention comprises: a step of determining whether different types of sheets supplied from the paper feeding conveyance unit are used with respect to the same special color in one printing job; a step of acquiring the color information of each of the sheets when the different types of sheets are determined to be used; a step of selecting any type of a sheet based on the acquired color information; and a step of creating the sample page in which a first image and a second image are arranged, on the sheet selected at the step of selecting a sheet, the first image having an output image of the special color, and the second image having a sheet estimation image that is a reproduction of a color of another type of a sheet, and the output image of the special color formed in a region of the sheet simulation image.

14. The method of creating a sample page according to Item. 13, the image forming system preferably holds color information of a standard paper, as a reference value, and the step of selecting a sheet preferably selects a sheet having a smallest color difference with respect to the reference value.

15. The method of creating a sample page according to Item. 14, wherein the step of selecting a sheet further preferably calculates color differences of other types of sheets with respect to the selected sheet, and when there is a sheet having the color difference larger than a first threshold, selects the sheet, as a second sheet, and the step of creating the sample page preferably creates a first sample page having a first image and a second image arranged on the first sheet, the first image having the output image of the special color, and the second image having a sheet simulation image that is a reproduction of a color of another type of a sheet having the first threshold or less, and other than the first sheet, and the output image of the special color formed in a region of the sheet simulation image, and preferably creates a second sample page having the output image of the special color formed on the second sheet.

16. To achieve at least one of the abovementioned objects, according to an aspect, a method of creating a sample page in an image forming system including: a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the method reflecting one aspect of the present invention comprises: a step of determining whether different types of sheets supplied from the paper feeding conveyance unit are used with respect to the same special color in one printing job; a step of acquiring the color information of each of the sheets when the different types of sheets are determined to be used; a step of comparing a color difference between sheets calculated based on the acquired color information, with a first threshold; a step of selecting either one of the types of sheets when the color difference is less than the first threshold, and creating the sample page in which a first image and a second image are arranged, on the selected sheet, the first image having an output image of the special color, and the second image having a sheet estimation image that is a reproduction of a color of another type of a sheet, and the output image of the special color formed in a region of the sheet simulation image; and a step of creating the sample page in which the output image of the special color is formed, on each of the sheets, when the color difference is the first threshold or more.

17. The method of creating a sample page according to any one of Items. 13 to 16, wherein the image forming system preferably includes a colorimeter that performs color measurement of the sheet on which an image is formed by the image forming unit, and the step of acquiring the color information of each of the sheets preferably acquires a color measurement result of the color measurement of a non-image forming region on the sheet, performed by the colorimeter, as the color information.

18. The method of creating a sample page according to any one of Items. 13 to 17, wherein the image forming system preferably stores a table in which a name of a type of a sheet and the color information are associated, and the step of acquiring the color information of each of the sheets preferably acquires the color information of the sheet from the name of a type associated with the storage tray using the table.

19. To achieve at least one of the abovementioned objects, according to an aspect, a non-transitory recording medium storing a computer readable program for causing an image forming system to create a sample page, the image forming system including: a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the program, reflecting one aspect of the present invention, for causing a computer to execute: a step of determining whether different types of sheets supplied from the paper feeding conveyance unit are used with respect to the same special color in one printing job; a step of acquiring the color information of each of the sheets when the different types of sheets are determined to be used; a step of selecting any type of a sheet based on the acquired color information; and a step of creating the sample page in which a first image and a second image are arranged, on the sheet selected at the step of selecting a sheet, the first image having an output image of the special color, and the second image having a sheet estimation image that is a reproduction of a color of another type of a sheet, and the output image of the special color formed in a region of the sheet simulation image.

20. To achieve at least one of the abovementioned objects, according to an aspect, a non-transitory recording medium storing a computer readable program for causing an image forming system to create a sample page, the image forming system including: a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the program, reflecting one aspect of the present invention, for causing a computer to execute: a step of determining whether different types of sheets supplied from the paper feeding conveyance unit are used with respect to the same special color in one printing job; a step of acquiring the color information of each of the sheets when the different types of sheets are determined to be used; a step of comparing a color difference between sheets calculated based on the acquired color information, with a first threshold; a step of selecting either one of the types of sheets when the color difference is less than the first threshold, and creating the sample page in which a first image and a second image are arranged, on the selected sheet, the first image having an output image of the special color, and the second image having a sheet estimation image that is a reproduction of a color of another type of a sheet, and the output image of the special color formed in a region of the sheet simulation image; and a step of creating the sample page in which the output image of the special color is formed, on each of the sheets, when the color difference is the first threshold or more.

BRIEF DESCRIPTION OF THE DRAWINGS

The above and other objects, advantages and features of the present invention will become more fully understood from the detailed description given herein below and the appended drawings which are given by way of illustration only, and thus are not intended as a definition of the limits of the present invention, and wherein:

FIGS. 3A and 3B are examples of a special color table;

FIG. 4 is a diagram for describing an LUT used in a color conversion unit;

FIG. 7 is an example of a history record;

FIG. 8 is an example of a setting screen of creation conditions of a sample page;

FIG. 12 illustrates an execution example of an actual job;

FIG. 14 is an example of the history record;

FIG. 15 is an example of the history record illustrated together with a first color sample image;

FIG. 16 is an output example of the sample page;

FIG. 19 is an output example of the sample page;

FIG. 20 is an example of a special color table;

FIGS. 21A and 21B are diagrams for describing an LUT used in a color conversion unit;

FIG. 22 is an example of a sheet color information table;

FIG. 27 is an execution example of a printing job;

FIG. 29 is an example of a color measurement result;

DESCRIPTION OF THE PREFERRED EMBODIMENTS

Hereinafter, embodiments of the present invention will be described with reference to the appended drawings. However, the scope of the invention is not limited to the illustrated examples. Note that the same element is denoted with the same reference sign in description of the drawings, and overlapping description is omitted. Further, dimension ratios of the drawings are exaggerated for the convenience of description, and the ratios may be different from actual ratios.

<Image Forming System A>

Figure 1:
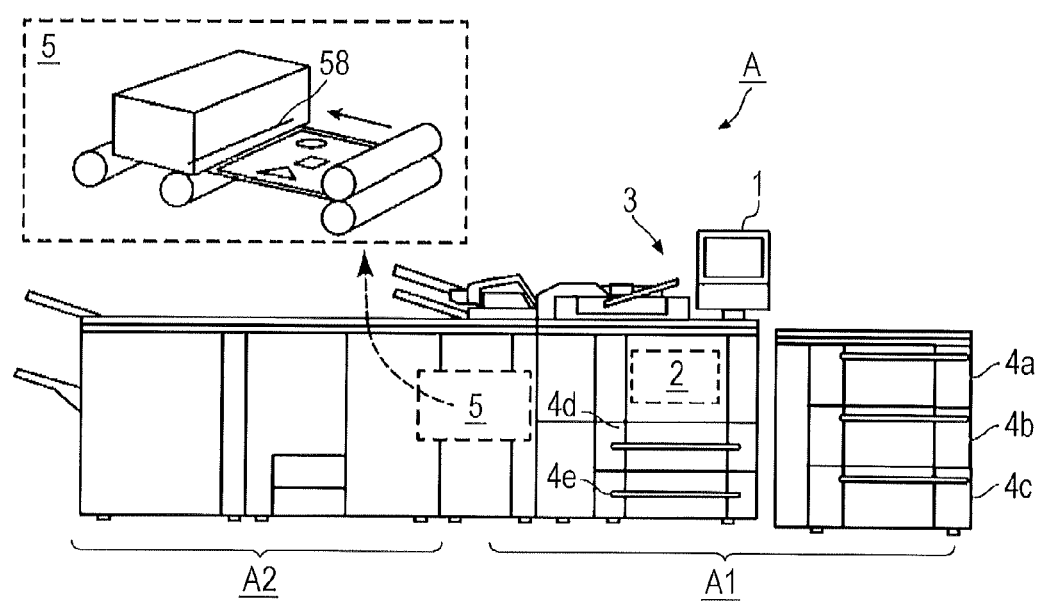
FIG. 1 is a diagram illustrating an example of a schematic configuration of an image forming system according to the present embodiment.
Figure 2:
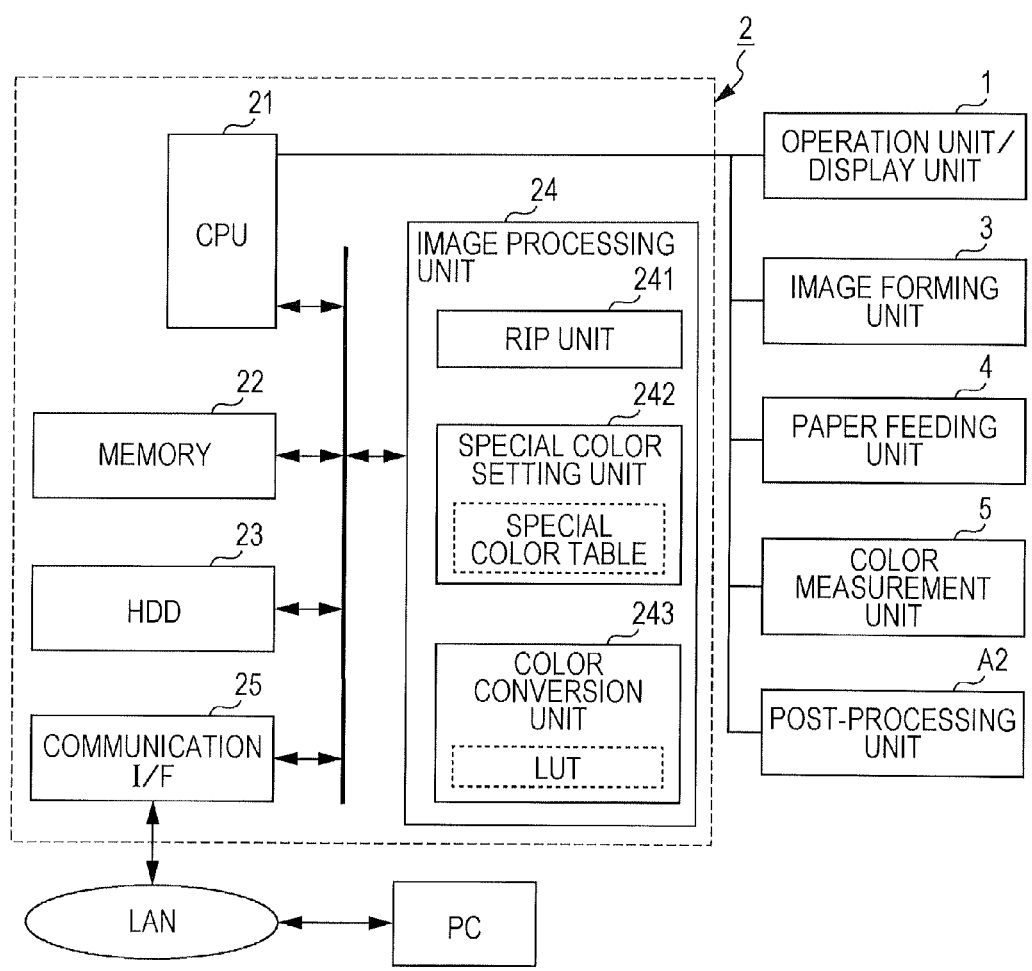
FIG. 2 is a block diagram illustrating a hardware configuration example of the image forming system.
Figure 5A:
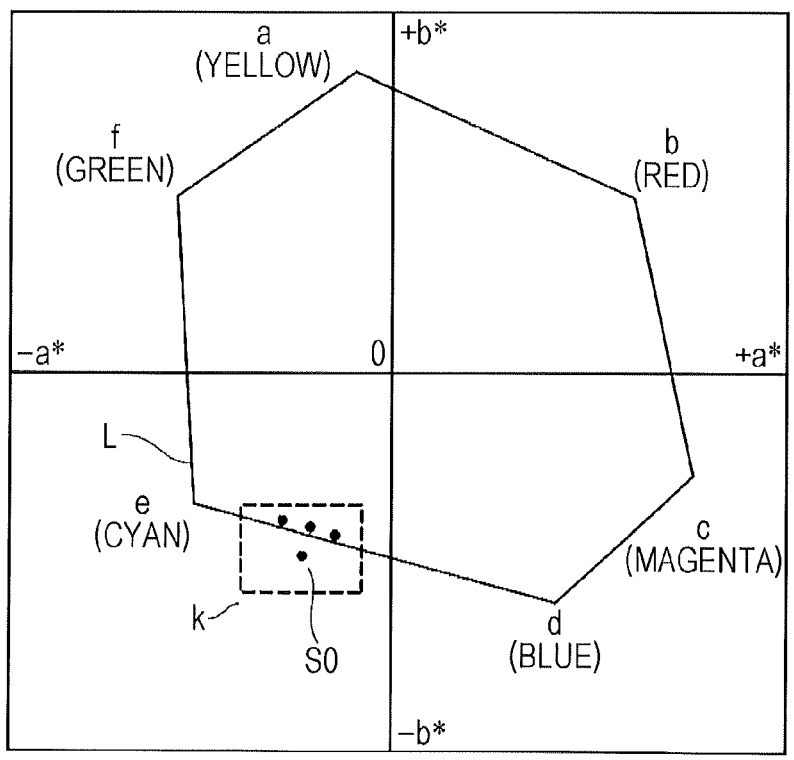
FIG. 5A is a diagram for describing a relationship between a color gamut reproducible with CMYK toners of the image forming system, and a color of a special color (special color)
Figure 5B:
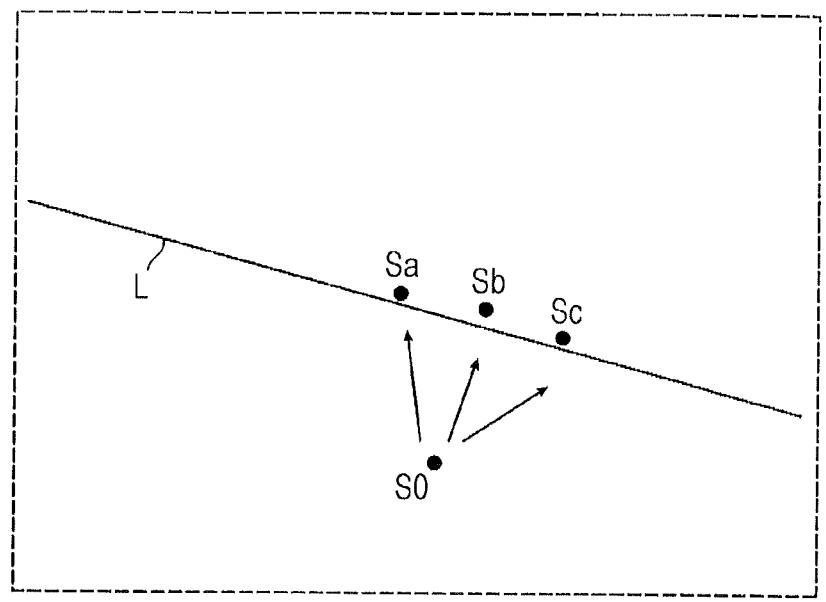
FIG. 5B is an enlarged diagram of FIG. 5A.

FIG. 1 is a diagram illustrating an example of a schematic configuration of an image forming system A according to an embodiment. FIG. 2 is a block diagram illustrating a hardware configuration example of the image forming system A. FIGS. 3A and 3B are examples of a special color table ("spot color library") with which identification information of a special color and color information are associated. FIG. 4 is a diagram for describing a look up table (LUT) used for color conversion processing. FIGS. 5A and 5B are schematic diagrams for describing a color reproduction region (hereinafter, referred to as "color gamut") that can be output in the present image forming system and a color of the special color.

Hereinafter, a schematic configuration of an image forming system A will be described with reference to FIGS. 1 to 5A and 5B.

As illustrated in FIG. 1, the image forming system A is configured from an image forming device A1 and a post-processing device A2.

The image forming device A1 includes a control unit/display unit 1, a control unit 2, an image forming unit 3, a paper feeding unit 4, and a color measurement unit 5.

The control unit/display unit 1 is configured from a touch panel formed such that a control unit of a touch sensor is interposed and arranged on a display unit such as an LCD, and can perform a setting operation of the image forming device A1 and the post-processing device A2 by a user.

As illustrated in FIG. 2, the control unit 2 that controls the image forming system A as a whole is configured from a CPU 21, a memory 22, an HDD 23, an image processing unit 24, and a communication I/F 25.

The CPU 21 is a control circuit configured from a multi-core processor that executes control of the above-described units and various types of calculation processing according to programs, and functions executable in the control unit 2 are exerted by execution of a corresponding program by the CPU 21.

The memory 22 is a main storage device that is accessible at a high speed and temporarily stores the programs and data as a working area. As the memory 22, a dynamic random access memory (DRAM), a synchronous dynamic random access memory (SDRAM), or a static random access memory (SRAM) is employed, for example.

The HDD 23 is a large-volume auxiliary storage device that stores various programs including an operating system and various data related to a processing function such as a look up table (LUT).

The image processing unit 24 includes a raster image processor (RIP) unit 241, a special color setting unit 242, a color conversion unit 243, and the like. The RIP unit 241 performs a raster image processor (RIP) processing of developing printing data described in PDL such as PCL, PS, or PDF received from a PC into bitmap data. Color information of pixels of the bitmap data is, for example, sRGB, L*a*b*, or identification information (an ID or a special color name) of the special color (spot color).

Some of the identification information of the special color are standardized, and some can be set uniquely to the image forming device. A special color table illustrated in FIGS. 3A and 3B is stored in the HDD 23 or the like. When the special color setting unit 242 has detected that the color information has been specified by the special color by analyzing the pixels, the special color setting unit 242 refers to the special color table illustrated in FIGS. 3A and 3B. FIG. 3A is a diagram for describing an LUT, and illustrates conversion of a signal of the special color as input color information into CMYK printer device values. Here, the "printer device values" are density signals of CMYK corresponding to basic colors of the image forming unit 3, and is density information specific to the device. FIG. 3B is a specific example of the LUT. Note that, hereinafter, the LUT as illustrated in FIG. 3B, in which a signal of the special color and the printer device values, or a signal of the special color and the original color information (L*a*b*) are associated with each other, is especially referred to as "special color table". By use of the special color table, the printer device values or the like can be determined according to the identification information such as a color name or an ID of the special color.

The special color setting unit 242 identifies a type of the special color from the identification information, and embeds a specific printer device value of the special color corresponding to the type of the special color, in an object pixel, by reference to the special color table. Further, the special color setting unit 242 passes arrangement position information (position coordinates on an XY plane) of the special color with respect to a sheet to the control unit 2, and the control unit 2 stores the position information in the HDD 23 as needed.

FIG. 4 is a diagram for describing the LUT used in the color conversion unit 243. FIG. 4 illustrates conversion of L*a*b* signals as input color information into CMYK signals.

The color conversion unit 243 uses the LUT as illustrated in FIG. 4 to convert the color information of the pixels into the CMYK density signals (hereinafter, referred to as "printer device values") corresponding to the basic colors of the image forming unit 3. Note that, in the present embodiment, an example of using L*a*b* as the color information will be described. However, color information in another format may be used as long as the color is not depending on the device.

The communication I/F 25 is an interface for communicating with an external device (such as a personal computer PC) through a network (LAN), and uses a standard such as Ethernet (registered trademark), Token Ring, FDDI, or Wi-Fi. Further, an interface for BlueTooth (registered trademark), infrared communication, and USB communication may be provided.

The image forming unit 3 forms an image on a sheet by an electrophotographic system. To be specific, the image forming unit 3 includes a developing unit including an exposure unit corresponding to color toners corresponding to the CMYK basic colors, a drum photoreceptor, and a developing device, an intermediate transfer belt that superimposes the toners formed in the developing unit, a secondary transfer roller that transfers a color toner image formed on the intermediate transfer belt to the sheet, a sheet conveyance unit that conveys the sheet, and a fixing device that fixes the toner image on the sheet by heating and pressurizing the toner image transferred on the sheet.

The paper feeding conveyance unit 4 includes a plurality of sheet storage trays 4a to 4e and a conveyance roller, and conveys sheets stored in the sheet storage trays 4a to 4e to the image forming unit 3 one by one. Further, the types and the color information of the sheets stored in the sheet storage trays 4a to 4e are stored in the HDD 23 as the sheet color information table as illustrated in FIGS. 5A and 5B. Setting of the types of the sheets can be performed by the user through the control unit/display unit 1. As the color information with respect to the types of the respective sheets, a color measurement result of the color measurement unit 5 described below is used. However, the color information may be set by the user by inputting numerical values.

The color measurement unit 5 is provided in the middle of a conveyance path (inline) between the image forming unit 3 and the post-processing device A2, and can perform color measurement of an image on the sheet being conveyed with a sensor 58. The color measurement unit 5 uniformly irradiates the sheet with light with a light source (lamp), and allows a reflection light to focus on the sensor 58 in a line manner through a light-receiving lens, thereby to perform the color measurement.

The sensor 58 is configured from three types of sensors of RGB, for example. The sensor 58 measures color values based on output values (RGB values) from the three types of sensors with respect to portions of a color image, and outputs measurement information. The sensor 58 has a sufficient length in a width direction (an axis direction of the conveyance roller) of the sheet to be conveyed, and can perform the color measurement of the entire region of the sheet.

The post-processing device A2 performs various types of post-processing such as stapling processing, punching processing, bookbinding processing, with respect to the sheets conveyed from the image forming device A1.

<Corresponding Relationship Between Color Gamut L and Color of Special Color>

FIGS. 5A and 5B are diagrams for describing a relationship between a color gamut that can reproduce colors with the CMYK toners of the image forming system A, and the color of the special color, and are diagrams of projection of an L*a*b* space on an a*b* plane. FIG. 5B is an enlarged diagram of FIG. 5A, and corresponds to a region a broken line square K.

In FIGS. 5A and 5B, a region L (a region surrounded by a hexagon with the reference signs a to f illustrates the color gamut that can be reproduced with the CMYK toners of the image forming system A. The reference sign S0 indicates the color of a special color C (see FIGS. 3A and 3B) that is one of the special colors. Wideness/narrowness of the color gamut L depends on a color material of a toner. Typically, the image forming unit 3 cannot reproduce all L*a*b* space. The color S0 of the special color C with a high chroma is actually positioned outside the color gamut L (outside the color gamut).

In the present embodiment, the special color setting unit 242 converts the pixels into the CMYK printer device values using the special color table illustrated in FIGS. 3A and 3B, with respect to the color S0 of the special color C. The image forming unit 3 has a problem that the color of the image output on the sheet is getting changed even with the same printer device values, as performing a large number of sheets of printing. In this case, recorrection processing of the color is performed as needed, in order to output a constant color. The recorrection processing of the color includes: to change the printer device values of the special color table by comparing the output image with a color sample truly an visually reproduced by the user, and to create and update a new LUT in which the relationship between the L*a*b* and the printer device values is described by measuring a large volume of patch images output with different printer device values by the color measurement unit 5 and to change the printer device values in the special color table based on the updated LUT. As illustrated in FIG. 5B, when the recorrection processing of the color is performed with respect to the special color S0 outside the color gamut, the color of the image output after the correction may sometimes be set to different colors as illustrated by colors Sa to Sc.

There are problems that the output image of the special color S0 outside the color gamut has to be output as any of the colors within the color gamut, and the output color (for example, the color Sa) is changed (to the color Sc, for example)

In the description below, a method of creating a sample page that outputs which color the special color outside the color gamut is output with, and how the color is changed (a "first color sample" described below corresponding to the color Sa), and an output of the object special color (a "second color sample" described below corresponding to the color Sc) on one sheet so that these colors can be visually compared will be described.

Processing of creating a sample page will be described with reference to FIGS. 6 to 15.

Figure 6:
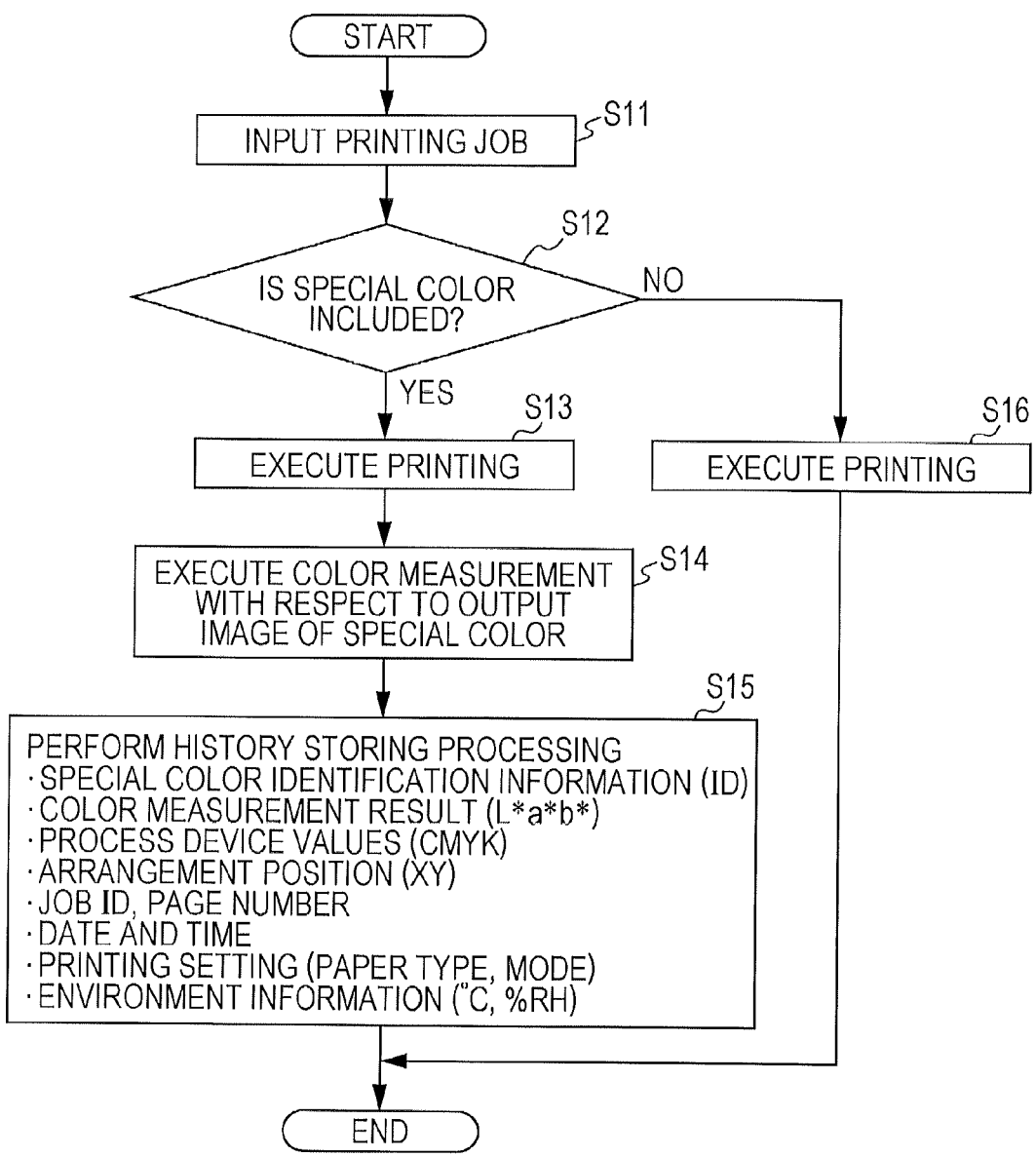
FIG. 6 is a control flow diagram related to history storing processing.

First, history storing processing will be described. FIG. 6 is a diagram illustrating a control flow processed in the control unit 2. At step S11, when an execution instruction of a printing job has been input, at step S12, the control unit 2 analyzes whether the special color is included in the received printing data. When the special color is not included, the control unit 2 executes normal printing and terminates the printing (step S16). When the special color is included (Yes at step S12), the control unit 2 executes the printing (step S13), refers to the arrangement position of the special color analyzed by the special color setting unit 242, and performs the color measurement by the color measurement unit 5 with respect to the output image of the special color (step S14).

At step S15, the control unit 2 performs processing of storing a history. FIG. 7 is an example of a history record obtained in the history storing processing. In the history record, a history ID, a job name, a job page, a date and time at which the history is acquired, the special color identification information, a history color measurement result (L*a*b*), a color difference of the history color measurement result with respect to the original color information of the special color (see FIGS. 3A and 3B), the printer device values (0 to 100), an XY coordinate position (mm) on the sheet of the output image, the printing setting such as the sheet type, a process speed, and a fixing preset temperature, and environment information are stored.

<Creation Conditions of Sample Page>

Next, creation conditions of a sample page will be described. FIG. 8 is an example of a setting screen of the creation conditions displayed in the control unit/display unit 1 or on a monitor screen of a PC connected to the LAN. A field 8a in FIG. 8 is a check box, and a selected special color is an object of creation of a sample page. Conditions of sample setting are set through a field 8b and a field 8c.

In the example illustrated in FIG. 8, a condition (hereinafter, referred to as "condition A") set to a special color A is for every 1,000 sheets of the number of output sheets. The history storing processing illustrated in FIG. 6 is executed for the first output image of the special color A, and after that, the sample page is output in every 1,000 sheets. For example, when 30 copies of printed matters are printed, one copy of the printed matter having 100 pages and using the special color A only on a cover sheet, the history storing processing is executed for the output image of the special color on the first page (the cover sheet), and after that, the sample page is output every time 10 copies are printed. Note that an example of the sample page will be described below.

A condition (hereinafter, referred to as "condition B") set to the special color C is to create the sample page when the color difference between a desired value, that is, the original color information of the special color C, and the color measurement result of the output image of the special color becomes 5 or more.

Note that the color difference referred here is $\Delta E^*ab$ indicated by a formula (1) below. In this specification, the color different is simply described as the color difference or $\Delta E$.

$$\Delta E^*ab = \sqrt{(\Delta L^*)^2 + (\Delta a^*)^2 + (\Delta b^*)^2} \quad (1)$$

A condition (hereinafter, referred to as "condition C") set to a special color G is to create the sample page when the color difference between the color measurement result of the output image of the special color and an output value of the first time becomes 3 or more. The output value of the first time is the color measurement result of the output image of the special color that is the first object of the same job.

Further, as for the conditions A and C, the same printing job can be limited to the object. Further, a plurality of the conditions A to C may be combined and set with AND or OR condition. Further, a sample page creation button is provided on the setting screen as illustrated in FIG. 8, and the sample page may be output because the condition is satisfied when the sample page creation button is simply selected.

Figure 9:
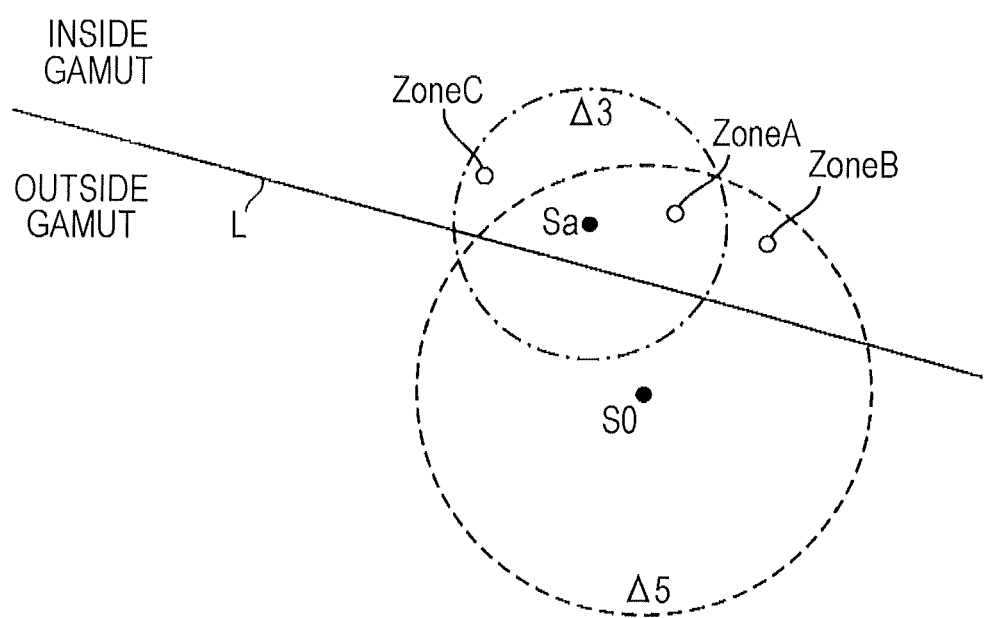
FIG. 9 is a diagram for describing a relationship between color differences with respect to original color information of the special color and a first color measurement value.

FIG. 9 is a diagram for describing the original color information S0 of the special color C and the first color measurement value Sa, and a relationship of the color differences between the colors. FIG. 9 corresponds to FIG. 5B, and an item common to FIG. 5B is denoted with the same reference sign. In FIG. 9, a broken line circle $\Delta 5$ represents a circle with a radius 5 having the color S0 as a center, a broken line circle $\Delta 3$ represents a circle with a radium 3 having the color Sa as a center. Note that, in FIG. 9, the color difference in an L* direction (in a direction perpendicular to an a*b* plane) is not caused for ease of description.

The color difference between the color in a zone A illustrated in FIG. 9 and the original color information S0 is less than 5, and the color difference between the color in the zone A and the first color measurement value Sa is less than 3, and thus the color in the zone A does not satisfy both of the conditions B and C with respect to the special color C.

The color difference between the color in a zone B and the original color information S0 is less than 5, but the color difference between the color in the zone B and the first color measurement value Sa is 3 or more, and thus the color in the zone B does not satisfy the condition B but satisfies the condition C.

The color difference between the color in a zone C and the original color information S0 is 5 or more, and the color difference between the color in the zone C and the first color measurement value Sa is less than 3, and thus the color in the zone C satisfies the condition B but does not satisfy the condition C.

Further, as the setting of a sample printing layout, a simulation of a past output can be selected in a field 8d, an output environment can be selected in a field 8e, patches for correction can be selected in a field 8f, and setting of whether a highlighted display of a changed portion can be selected in a field 8g. These output examples will be described in an actual example of the sample page described below.

<Creation of Sample Page>

Figure 10:
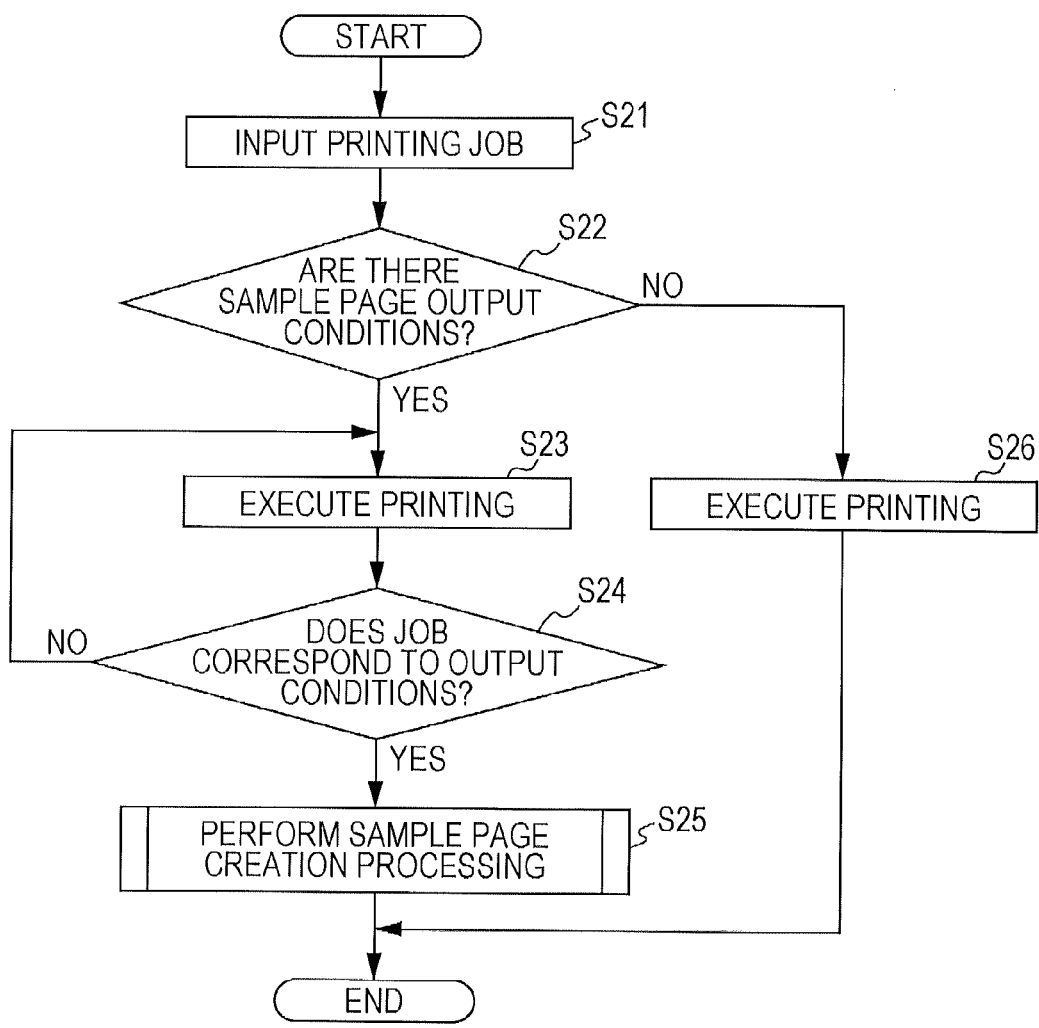
FIG. 10 is a diagram illustrating a control flow related to creation of the sample page executed by a control unit.

FIG. 10 is a diagram illustrating a control flow related to the creation of the sample page executed by the control unit 2.

At step S21, when an execution instruction of a printing job has been input, at following step S22, the control unit 2 determines whether the condition setting of an output of the sample page has been set to the printing job. When there is no condition setting of an output, the control unit 2 performs normal printing, and terminates the processing (step S26). When there is the condition setting of an output (Yes at step S22), the control unit 2 continues the printing (step S23) while the job does not correspond to the output condition (No at step S24), and when the job corresponds to the output condition (Yes at step S24), the control unit 2 executes the processing of creating the sample page of step S25.

Figure 11:
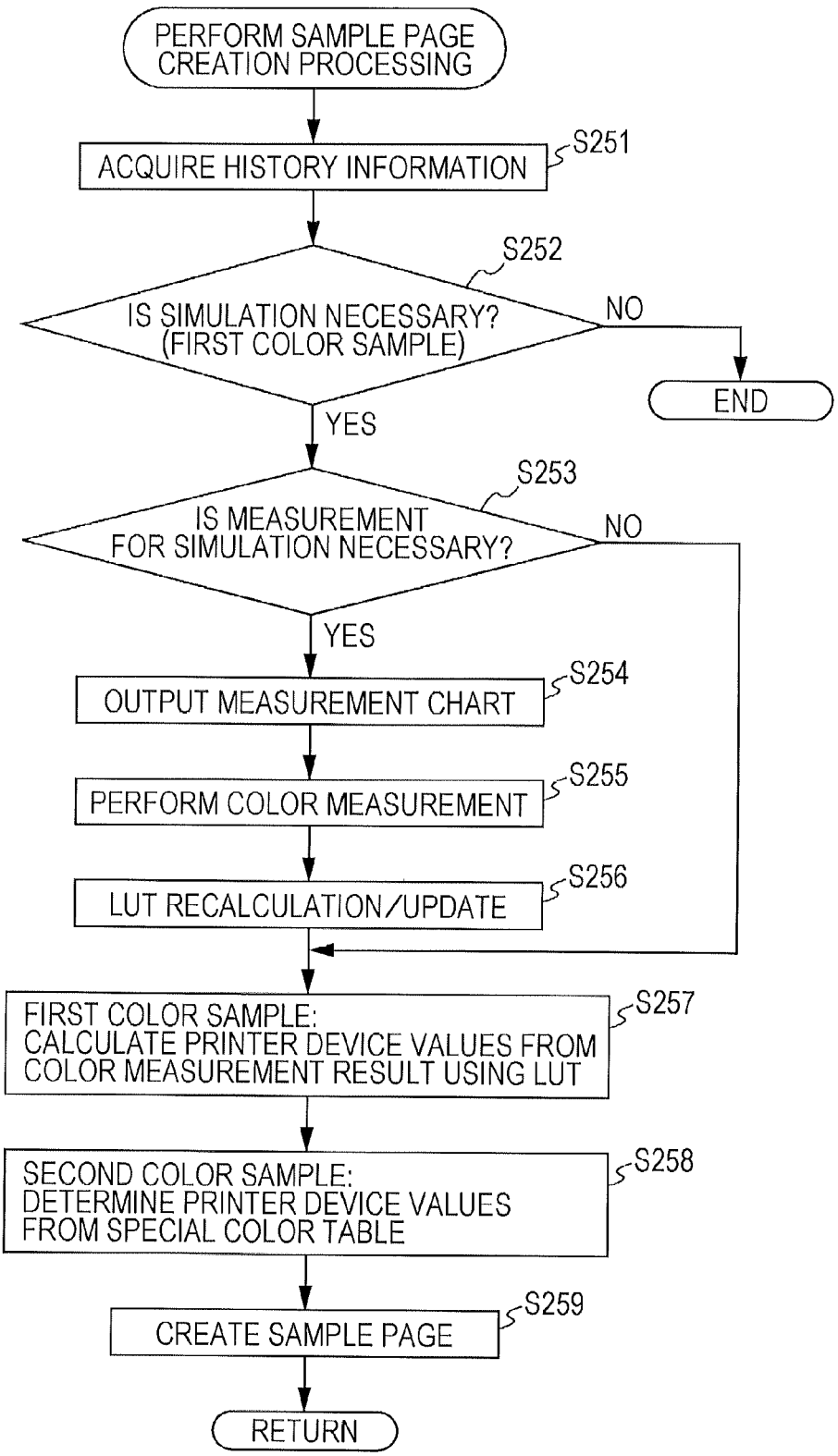
FIG. 11 is a diagram for describing a sub-routine of sample page creation processing.

FIG. 11 is a diagram for describing a sub-routine of the processing of creating the sample page (step S25). At step S251, the control unit 2 acquires the history information of the special color. The object record is a record having the same identification information as the identification information of the object special color.

At step S252, the control unit determines whether the setting requires the simulation of a past output (output reproduction). When the simulation of a past output is not the necessary setting (No at step S252), the control unit 2 outputs the sample page that indicates numerical value data of the history information and the like, and terminates the processing. This process corresponds to the case where a check mark is placed in the field 8d of FIG. 8.

When the check mark is placed in the field 8d of FIG. 8 (Yes at step S252), the control unit 2 proceeds to step S253, and determines whether the measurement for simulation is necessary. This determination is performed according to whether update of the LUT is necessary, for example. Whether update of the LUT is necessary can be determined from the number of printed sheets after update of the LUT was previously performed, environmental change such as temperature and humidity, or change of the color measurement result of the patch image for density confirmation. If necessary (Yes at step S253), the control unit 2 performs the update of the LUT in following steps S254 to S256.

To be specific, at step S254, the control unit 2 outputs a measurement chart. This is a measurement chart made of hundreds of color patches made of combinations of the CMYK printer device values. The measurement chart is output to a plurality of pages. The control unit 2 executes the measurement of the color patches (step S254), performs interpolation calculation based on the color measurement results, and obtains thousands of color corresponding relationships, thereby to calculate a new LUT. The control unit 2 stores the new LUT in the HDD 23 to update the past LUT.

At step S257, the control unit 2 calculates the printer device values of the "first color sample", the history color measurement result of which has been simulated. The control unit 2 calculates the printer device values (hereinafter, may be referred to as "printer device value for simulation") using the history color measurement result (L*a*b*) stored in the history record as illustrated in FIG. 7 and the current LUT. Since the printer device values are calculated using the current proper LUT, the history color measurement result can be reproduced with high accuracy. Note that, when a plurality of histories is stored, a plurality of printer device values for simulation is calculated based on all of the history color measurement results, as default setting (for example, an example of FIG. 16 described below). However, the setting is not limited thereto. It can be set to use only the history color measurement result of the oldest time stamp or of the latest time stamp, or to use an arbitrary history color measurement result according to selection of the user.

At step S258, the control unit 2 determines the printer device values of the "second color sample" using the special color table.

At step S259, the control unit 2 outputs a sample image obtained such that the first color sample image and the second color sample image are arranged on a sheet, using the printer device values for simulation calculated at step S257 and the printer device values determined at step S258. In a case where the special color is applied to a logo of a company, the shape of the color sample image may reflects the logo shape, or may be a simple circle or a square.

Next, a specific example will be described based on FIGS. 12 to 16.

FIG. 12 illustrates an execution example of an actual job. One printing job #001 is a job of 10,000 pages, and the special color A is included as the special color. Since the setting of the color measurement is ON at the third page and the 9998th page, the control unit 2 controls the color measurement unit 5 to perform the color measurement of the object special color based on the special color position information.

Further, FIG. 12 illustrates the printer device values applied at that time about the special color, as a reference. When this data is recorded as the history, the page ID is used as the history ID, and the history ID is recorded together with the color measurement result as a series of the history record.

Figure 13:
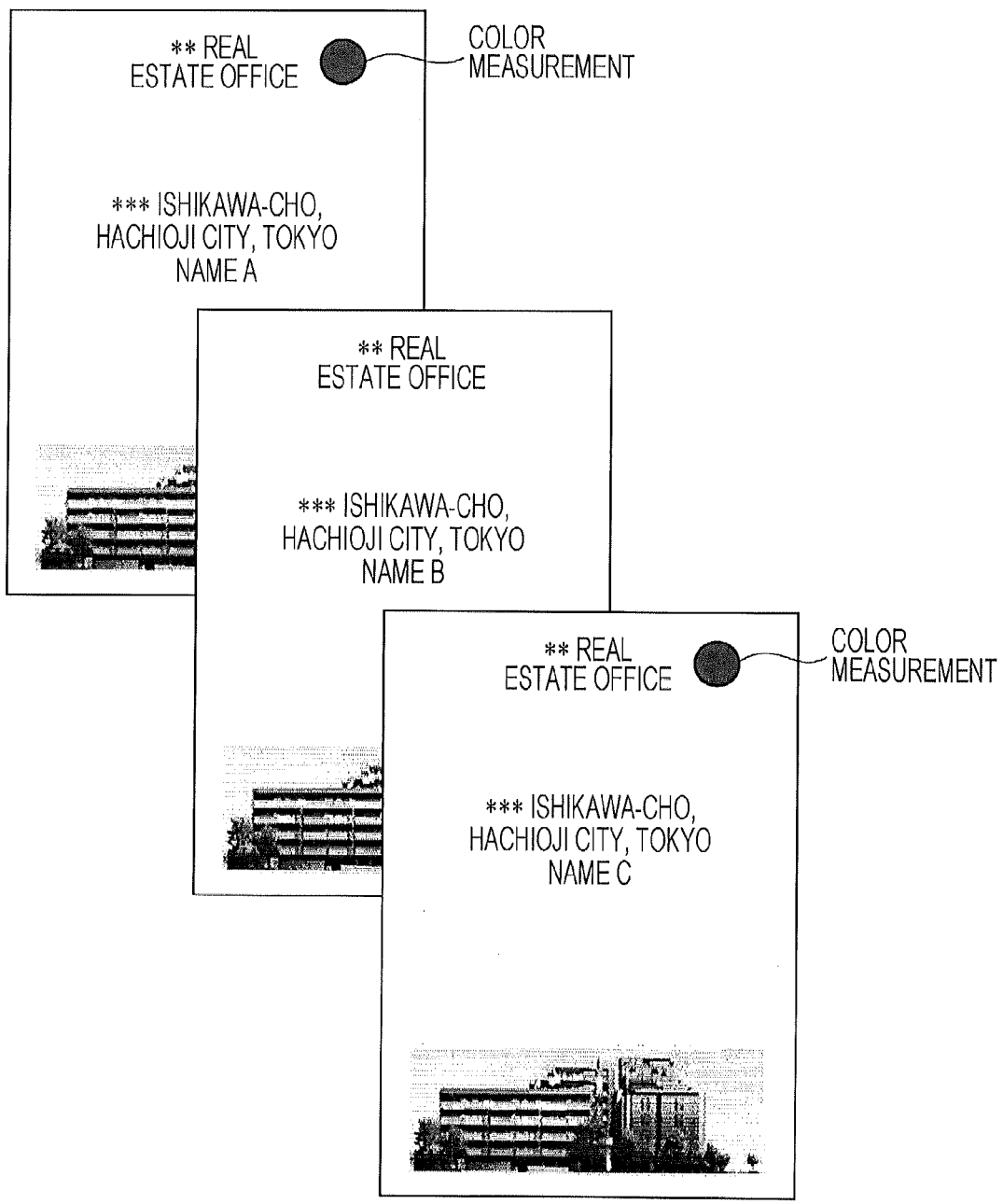
FIG. 13 is an example of a printing result.

FIG. 13 illustrates an example of a printing result. In the example illustrated in FIG. 13, three sheets are extracted from among the continuously printed sheets. On the first and third sheets, the logo mark using the special color is printed on positions corresponding to arrows in FIG. 13. Therefore, the color measurement unit 5 performs the color measurement about the positions, and sends color measurement results to the control unit 2.

FIG. 14 illustrates an example of the history record. The example illustrates that the original color information and a plurality of pieces of history information are recorded with respect to a plurality of special colors. The history record in the form as illustrated in FIG. 7 is associated with each of the history IDs.

Next, an output example of the sample page will be described with reference to FIGS. 15 and 16. FIG. 15 is a list of the history information illustrated together with the first color sample image extracted from the history record. FIG. 16 is an output example of a sample page 9. In FIG. 16, output images of three first color sample images 91 (91a to 91c) and of one second color sample image 92 are formed on one sheet. In FIG. 16, the shape of the sample image is the same shape (a circular shape) as the logo mark illustrated in FIG. 13.

Further, the printer device values for simulation used for the output are illustrated with respect to the first color sample image 91. Note that the printer device values for simulation are calculated in step S257 of FIG. 11. In a history field 96 of FIG. 16, a date and time at which the history was acquired as the output information, the color measurement result at that time, and the printer device values are indicated. Note that the first color sample image is applied the printer device values for simulation calculated with the latest LUT, and thus the first color sample image truly reproduces the color information described in the color measurement result.

At an upper portion of the sample page, estimated color information, and a color difference between the estimated color information and the original color information are indicated together with the second color sample image 92 formed using the printer device values calculated based on the original color information. The "estimated color information" displays the color measurement result, the color measurement having been previously performed with respect to the object special color. In FIG. 16, the sample page is output when the setting is satisfied, the setting being of outputting the sample page when the condition B (the color difference between the color measurement result and the original color information ΔE≥5) is satisfied. The estimated color information specifically indicates the color measurement result immediately before the condition B is satisfied (of several pages before the sample page, for example). Note that, when there is no previous color measurement result, to determine the estimated color information, a sheet on which the output image of the special color is formed is printed, the printed sheet is subjected to the color measurement in the color measurement unit 5, and the color measurement result may be used as the estimated color information.

As described above, in the present embodiment, when it has been determined that the creation conditions of the sample page is satisfied, the sample page having the first color sample image and the second color sample image formed on the recording medium is created, the first color sample image being according to the printer device values for simulation calculated based on the history color measurement result of the special color, and the second color sample image being according to the printer device values determined according to the special color table, whereby change of a color tone of the special color becomes relatively visually possible. Therefore, color determination of the special color can be more effectively performed.

Further, the color difference between the first color sample image and the original color information, and the printer device values are indicated on the sample page, whereby these pieces of information can be used as auxiliary information of when comparison and determination are performed.

Figure 17:
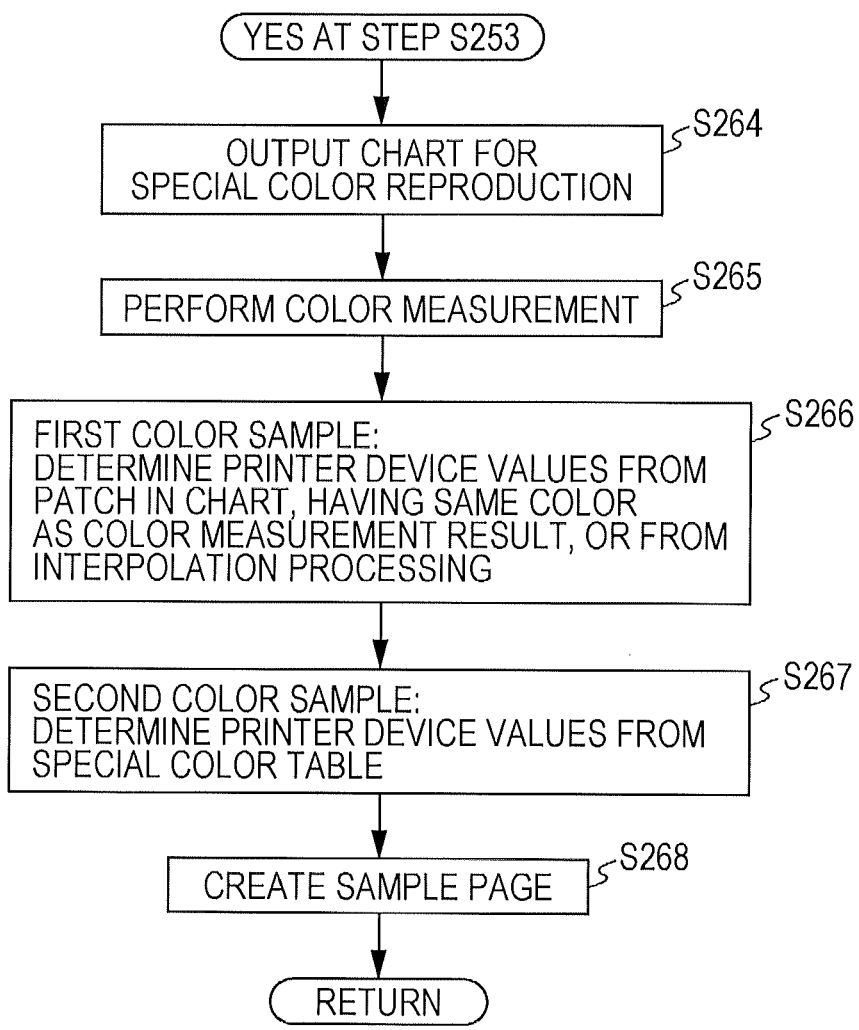
FIG. 17 is a diagram illustrating a control flow related to creation of a sample page executed by a control unit in a second embodiment.

FIG. 17 is a diagram illustrating a control flow related to creation of a sample page executed by a control unit 2 in another embodiment. In the present embodiment, measurement for simulation is simply performed with respect only to a vicinity of a color of an object special color.

FIG. 17 illustrates a flow of step S253 and subsequent steps of FIG. 11 when step S253 is Yes. An embodiment except the flow illustrated in FIG. 17 is the same as that illustrated in FIGS. 10 and 11, and description is omitted.

Figure 18:
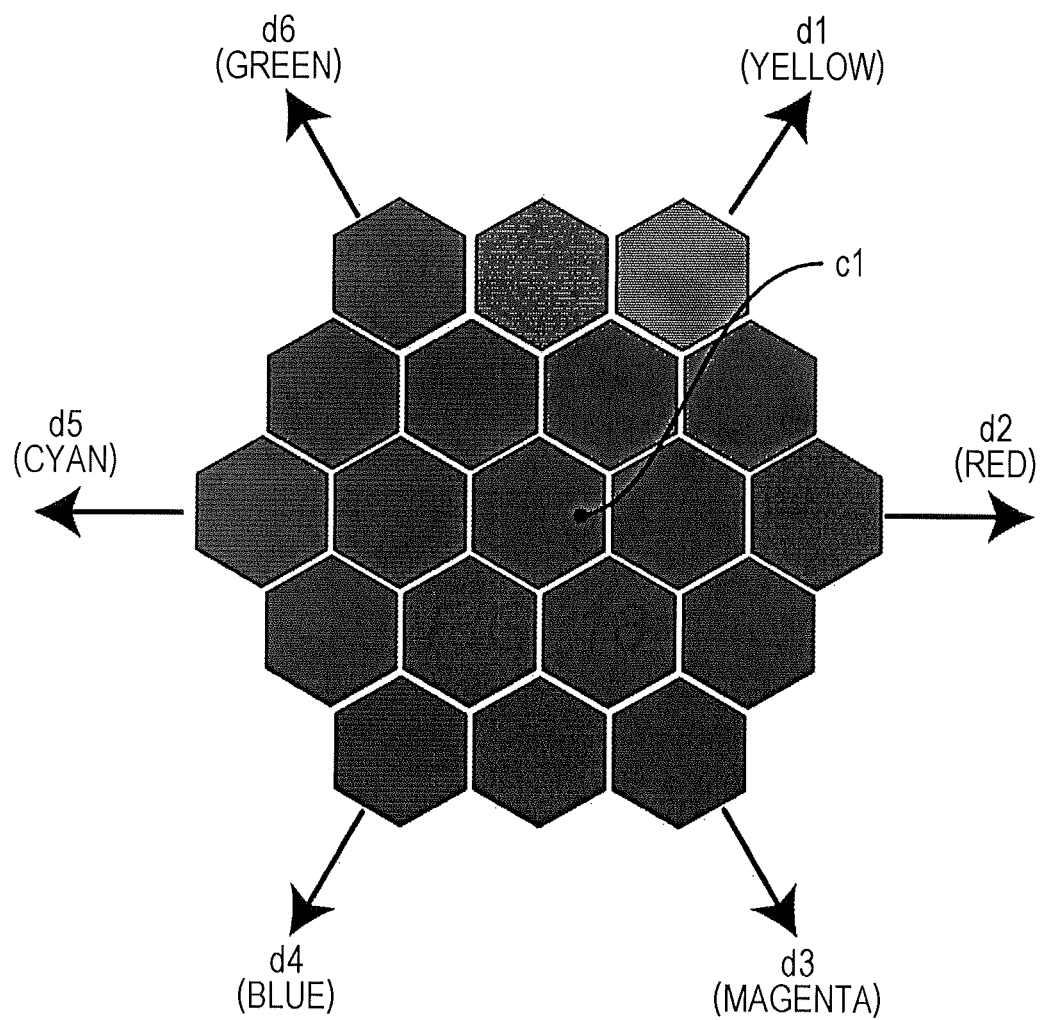
FIG. 18 is an example of a hart for special color reproduction used for correction.

At step S264 of FIG. 17, the control unit 2 outputs a chart for special color reproduction. FIG. 18 illustrates an example of the chart for special color reproduction to be used for correction. A center c1 of the chart for special color reproduction is output according to printer device values calculated according to a current LUT and a history color measurement result of the special color. Directions d1 to d6 respectively correspond to Y, R, M, B, C, and G on an a*b* plane in an L*a*b* space. A plurality of patch images having different printer device values is arranged around the center c1, the printer device values being differentiated to change a*b* bit by bit. Although illustration is omitted, two other patch groups are formed on the sheet. Darkness of the two other patch groups are differentiated from a group of 19 patches illustrated in FIG. 18 in the L* direction.

At step S265, the control unit 2 performs color measurement of these patches formed on the chart. Determination of printer device values of a first color sample image is determined such that, as illustrated at step S266, if there is a patch of the same color (L*a*b*) as the history color measurement result exists on the chart, printer device values corresponding to the same color are determined as printer device values for simulation, and if not, the printer device values for simulation are determined by performing interpolation processing of colors among a plurality of patches.

Meanwhile, with respect to a second color sample image, at step S267, printer device values of the special color are determined using a special color table.

At step S268, the sample page is created using the printer device values calculated at step S266 and S267.

As described above, in the present embodiment, the color patches are formed around the vicinity of the special color, and the measurement for simulation is performed. Therefore, man-hours necessary for update of the LUT can be reduced, compared with a case of forming the color patches throughout an entire color gamut.

FIG. 19 illustrates a sample page 9b in the another embodiment. The example of FIG. 19 is an output example of when check marks are placed in all of the field 8e (output environment), the field 8f (patches for correction), and the field 8g (highlighted display) of FIG. 8.

In a sample page 9b, output conditions held as a history are indicated with respect to first color sample images 93a to 93c. The output conditions referred here is printing setting of printing, and an ambient temperature and humidity environment, stored in a history record as illustrated in FIG. 7. The printing setting includes a sheet type, a process speed, and a fixing preset temperature.

Further, at that time, items (the reference signs 99a, 99b, 99c, and the like) substantially changed from a previous history is highlighted to be distinguished from other items.

Further, in FIG. 19, similarly to FIG. 18, six patch images having different printer device values are formed around the first color sample images 93a to 93c on the sheet, the printer device values being differentiated to change the a*b* bit by bit in six directions of d1 to d6 on the a*b* plane, and the six patches are denoted with respective numbers. A user selects a most appropriate color from among the patches, and specifies the color, thereby to correct the special color. For example, when the user determines that the color with a color tone changed into the direction 6 (a green direction) is more favorable than the patch 93a with the output information of 9/1, the control unit 2 inputs A6, which is the corresponding number, through a specifying screen (not illustrated) displayed in the control unit/display unit 1, thereby to reflect the printer device values used for an output of A6 to the special color table. Hereinafter, the control unit 2 performs determination of the printer device values using the updated special color table.

The program that operates the control unit 2 may be provided with a computer-readable recording medium such as a USB memory, a flexible disk, or a CD-ROM, or may be provided online through a network such as the Internet. In this case, the program recorded in the computer-readable recording medium is usually transferred to and stored in a ROM or an HDD. Further, the program may be provided as a single piece of application software, or may be incorporated in software of a device as one function of the image forming system A.

Further, the processing by the elements of the function configurations can be realized by a dedicated hardware circuit such as an application specific integrated circuit (ASIC). In this case, the processing may be executed by a single piece of hardware, or may be executed by a plurality of pieces of hardware.

FIG. 20 illustrates an example of the special color table (may sometimes be referred to as "spot color library") which the identification information of the special color and the color information are associated. FIGS. 21A and 21B are diagrams for describing the LUT (look up table) used for processing of color conversion. FIG. 22 is an example of a sheet color information table related to the sheets stored in the plurality of sheet storage trays (4a to 4e).

FIG. 20 is an example of the special color table indicating a corresponding relationship between the identification information of the special color set in the image forming device, and the color information. The special color table is stored in the HDD 23, or the like. When the special color setting unit 242 has detected that the color information has been specified by the special color, by analyzing the pixels, the special color setting unit 242 refers to the special color table illustrated in FIG. 20. The special color setting unit 242 identifies the type of the special color from the identification information, and embeds specific color information of the special color corresponding to the type of the special color in the pixels. Further, the special color setting unit 242 passes the arrangement position information (position coordinates on the XY plane) of the special color with respect to the sheet, to the control unit 2, and the control unit 2 stores the position information in the HDD 23 as needed.

FIGS. 21A and 21B are diagrams for describing the LUT used in the color conversion unit 243. FIG. 21A illustrates conversion of the L*a*b* signals as input color information into the CMYK signals as outputs. FIG. 21B is an example of using standard RGB (sRGB) as the input color information.

The color conversion unit 243 uses the LUT as illustrated in FIGS. 21A and 21B to convert the color information of the pixels into the CMYK density signals (hereinafter, referred to as "printer device value") corresponding to the basic colors of the image forming unit 3. Note that the pixels at this time are pixels developed by the RIP unit 241 and to which the color information is set, or pixels to which the color information is set by the special color setting unit 242 subsequently.

<Processing of Creating Sample Page>

The processing of creating a sample page in the present embodiment will be described with reference to FIGS. 23 and 24.

<Creation Conditions of Sample Page>

First, the creation conditions of the sample page will be described. FIG. 23 is an example of a setting screen of the creation conditions of the sample page displayed in the control unit/display unit 1 or on a monitor screen of a PC connected to the LAN. A field 6a in FIG. 23 is a check box, and a selected special color is an object of creation of the sample page. Sample conditions are set through a field 6b and a field 8c.

Figure 23:
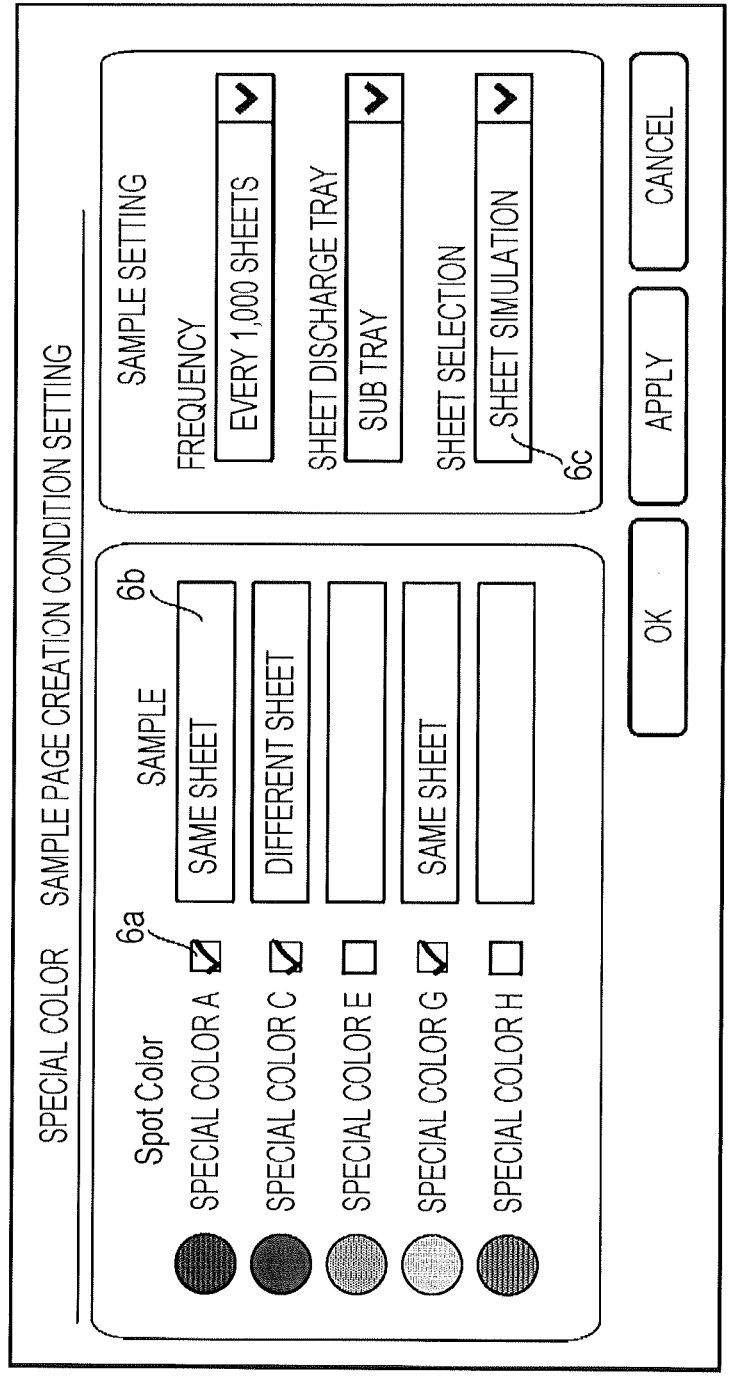
FIG. 23 is a diagram of a setting screen of creation conditions of the sample page.

In the example illustrated in FIG. 23, the check boxes of the special colors A, C, and G of a plurality of special colors are effective. In the field 6b, "the same sheet" is set to the special colors A and G, and "different sheet" is set to the special color C. In the field 6c, sheet simulation is set, and thus the sheet simulation described below is executed with respect to the special colors A and G, which are set to the "the same sheet". Meanwhile, the sheet simulation is not executed to the special color C, which is set to the "different sheet".

<Creation of Sample Page>

Figure 24:
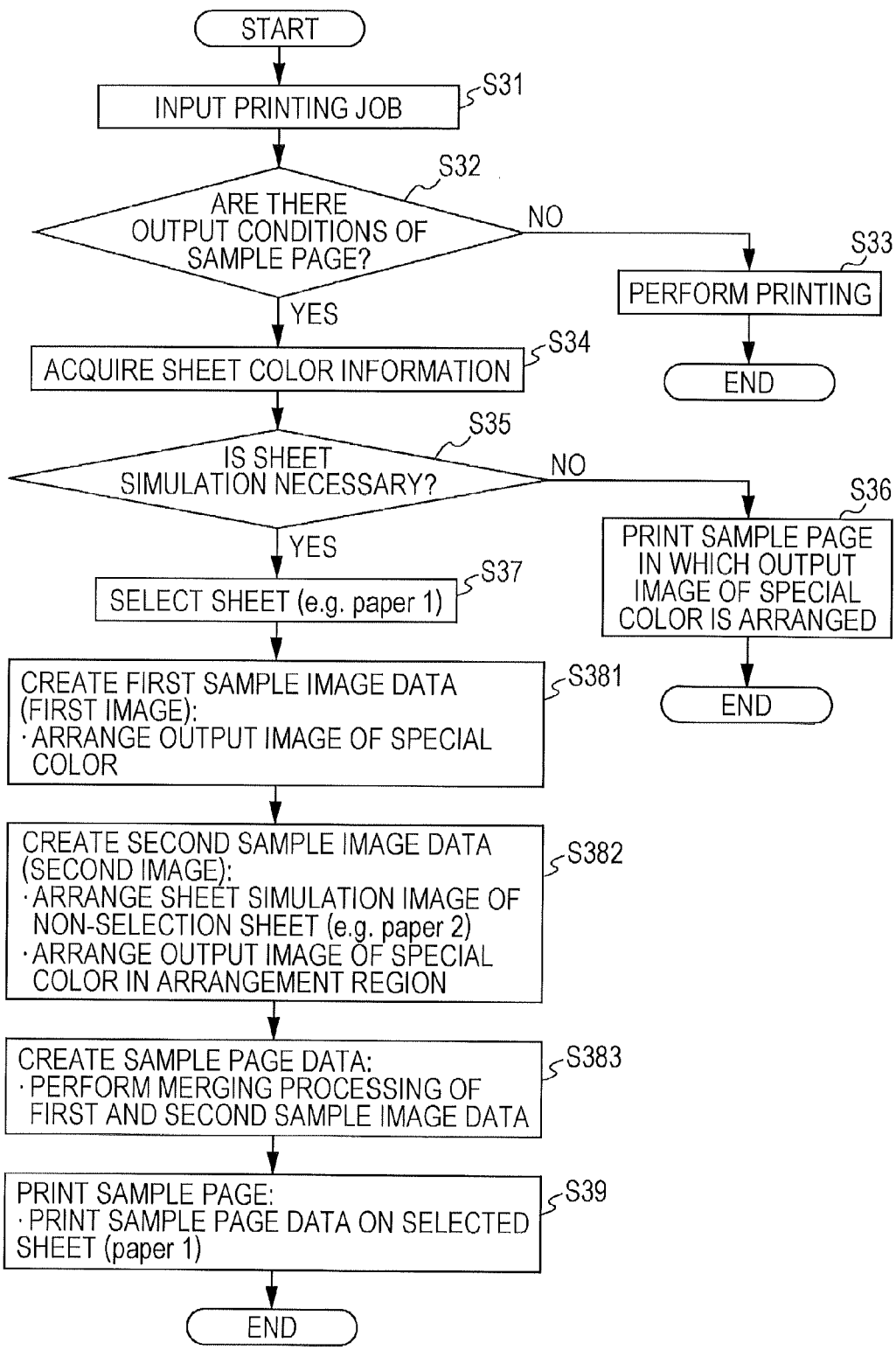
FIG. 24 is a diagram illustrating a control flow related to the creation of the sample page executed by the control unit.

FIG. 24 is a diagram illustrating a control flow related to the creation of the sample page executed by the control unit 2.

At step S31, when an execution instruction of a printing job has been input, at step S32, the control unit 2 determines whether the output setting of the sample page has been set to the received printing job, and when there is no condition setting of an output, the control unit 2 executes normal printing, and terminates the processing (step S33). When there is the condition setting of an output (Yes at step S32), at step S34, the control unit 2 refers to the sheet color information table as illustrated in FIG. 22 to acquire the color information of the sheet. As the color information, the L*a*b* values may be used. However, in the present embodiment, the CMYK values converted into the printer device values.

At step S35, the control unit 2 determines whether the sheet simulation is necessary. The control unit 2 determines the sheet simulation is necessary when both of (1) and (2) below are satisfied. (1): the setting is set to setting of executing the sheet simulation. (2): an image of the same color is formed using different types of sheets in one printing job.

(1) is determined from the setting of the field 6c of FIGS. 23, and (2) is determined by analyzing the printing setting included in the printing data and print data. Note that the condition (2) is not satisfied when the sheets are the same type even if different sheet storage trays are used. Further, it may be determined that the condition (2) is not satisfied when there is not a substantial difference between the values of the color information even if the sheets are different types, i.e., when the color difference is smaller than a predetermined value.

When having determined that the sheet simulation is not necessary (No at step S35), the control unit 2 does not perform the sheet simulation, and simply print the sample page in which an output image of the special color is arranged (step S36) and terminates the processing.

When having determined that the sheet simulation is necessary (Yes at step S35), the processing is moved onto step S37. At step S37, the control unit 2 selects one type of a sheet from among a plurality of types of sheets, which is used for an output of the same special color. The selection can be considered: (1) to select a sheet closest to the color information of a standard paper (recommended paler) stored in the HDD 23 of the image forming system A in advance, (2) to select a sheet closest to white (achromatic color), and (3) to select a type of a sheet, the number of the type of sheets used in the printing job is the largest. In the present embodiment, (1) is employed.

At steps 381 to S383, the control unit 2 creates sample page data (printing data) to be used for the output of the sample page. At step S381, the control unit 2 creates first sample image data ("first image"). The first image is an image obtained such that an output image such as a logo mark of the special color included in the printing data is arranged in a predetermined region. An image around the output image of the special color is a white background (NULL data). Note that an output of only the first sample image corresponds to the sample page of step S36.

In next step S382, the control unit creates second sample image data ("second image"). For the second sample image data, the control unit 2 creates a sheet simulation image based on the color information of a sheet (non-selection sheet) that has not been selected at step S37. To be specific, the "shape" is a predetermined region having a space to surround the output image of the special color, for example, a rectangle having a size sufficiently larger than the output image of the special color, and the "printer device values" is set with the CMYK values of the non-selection sheet acquired at step S34.

Then, the control unit 2 arranges the output image of the special color within a region of the sheet simulation image, to be specific, on the center. Note that the output image of the special color originally has the same shape and the same printer device values as the output image of step S381. However, in the second sample image data, the printer device values of the background sheet simulation image is added, and therefore, the printer device values of the second sample image data are different.

Note that, as the printer device values of the sheet simulation image, the printer device values (CMYK values) listed on the table of FIG. 22 may be used as they are, or difference values from the printer device values of the sheet selected at step S37 may be used. Further, the number of the second sample image data created at step S382 is not limited to one.

A plurality of the second sample image data is created when the types of sheets that form the output image of one special color is three or more.

At step S383, the control unit 2 creates the sample page data corresponding to one sheet by performing merging processing of the first sample image data and the second sample image data.

At step S39, the control unit creates the sample page based on the sample page data created at step S383 using the sheet selected at step S37.

Figure 25:
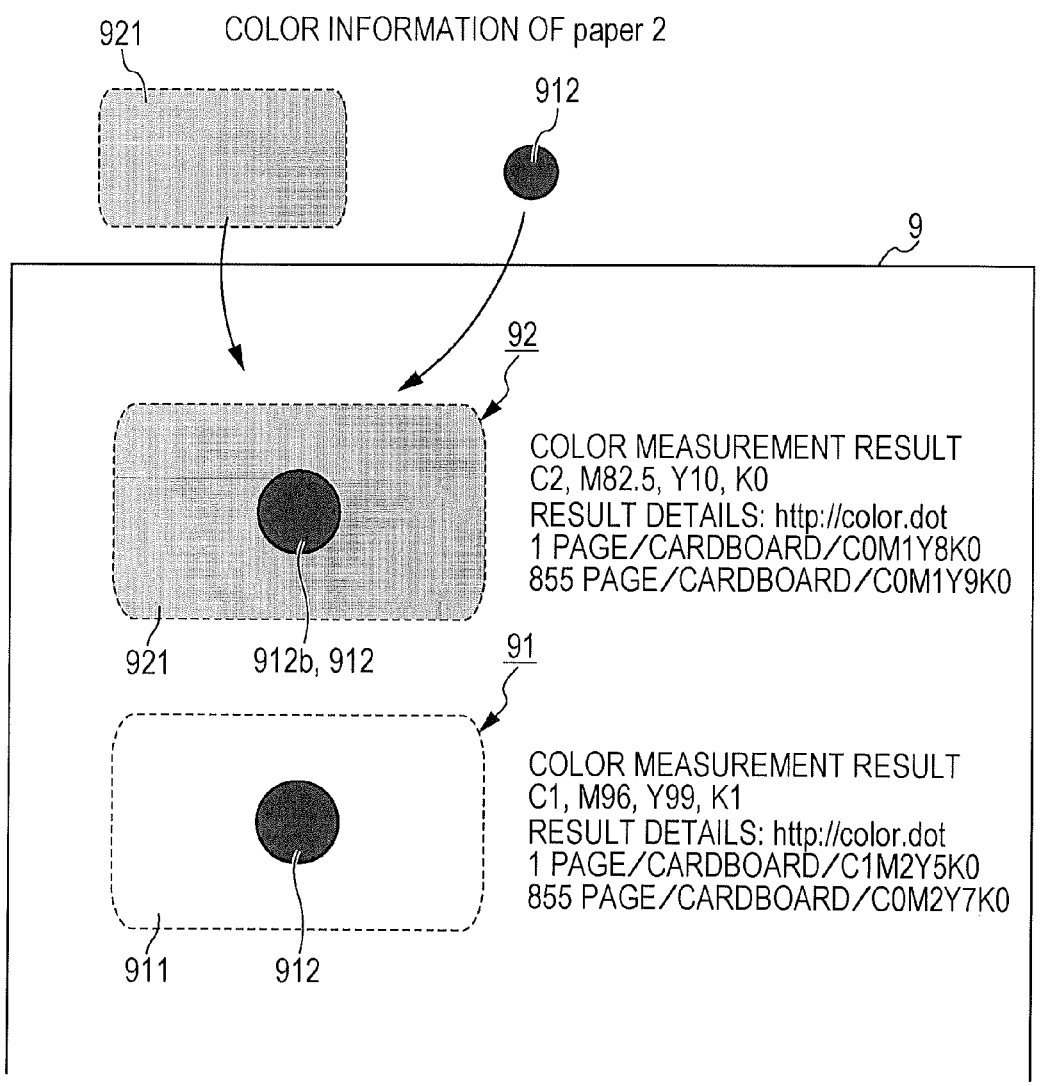
FIG. 25 is an example of a sample page.

FIG. 25 is an example of the sample page 9. On the sample page 9, an output image 912 of the special color is arranged on the center of a first image 91. A peripheral region 911 of the output image 912 is a white paper region and no printing is performed thereon. That is, a surface of the sheet (for example, a paper 1) used for the sample page 9 is exposed. On the second image 92, an output image 912b of the special color is arranged in a region of the sheet simulation image 921. The output image 912 and the output image 912b originally have the same shape and the same printer device values. However, on the sample page 9 as described above, an image of an inner region of the output image 912 is formed with the printer device values of the special color A illustrated in the table of FIG. 20, but an image of an inner region of the output image 912b is formed with values obtained by adding the printer device values of the sheet simulation image 921 to the printer device values of the special color A, and therefore, the printer device values of the output image 912 and of the output image 912b are different.

Note that the sheet simulation image 921 is reproduced by simulating the color of the sheet, and thus may be formed with a size to surround the output image 912 without posing a problem for observation with eyes of a human.

Figure 26:
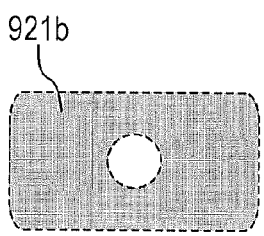
FIG. 26 is a modification of a sheet simulation image 921b.

As a modification, by use of a sheet simulation image 921b having a region inside as described in FIG. 26, the region having the same shape as the output image of the special color and having the printer device values of zero (NULL), the output image 912 may be arranged in the zero region. When such a simulation image is applied, the output images of the special color in the first image 91 and the second image 92 are formed with the same printer device values.

As described above, in the present embodiment, when the different types of sheets are used for the output image of the same special color in one printing job, one type of a sheet is selected, the output image of the special color is formed on the sheet as the first image, and the sheet simulation image on which the color of another type of a sheet is reproduced as the second image is formed, and the output image of the special image is arranged in the region of the second image. By outputting the sample page on which the first and second images are arranged, the difference of the color tone due to the difference of the types of sheets can be compared and determined.

Figure 28:
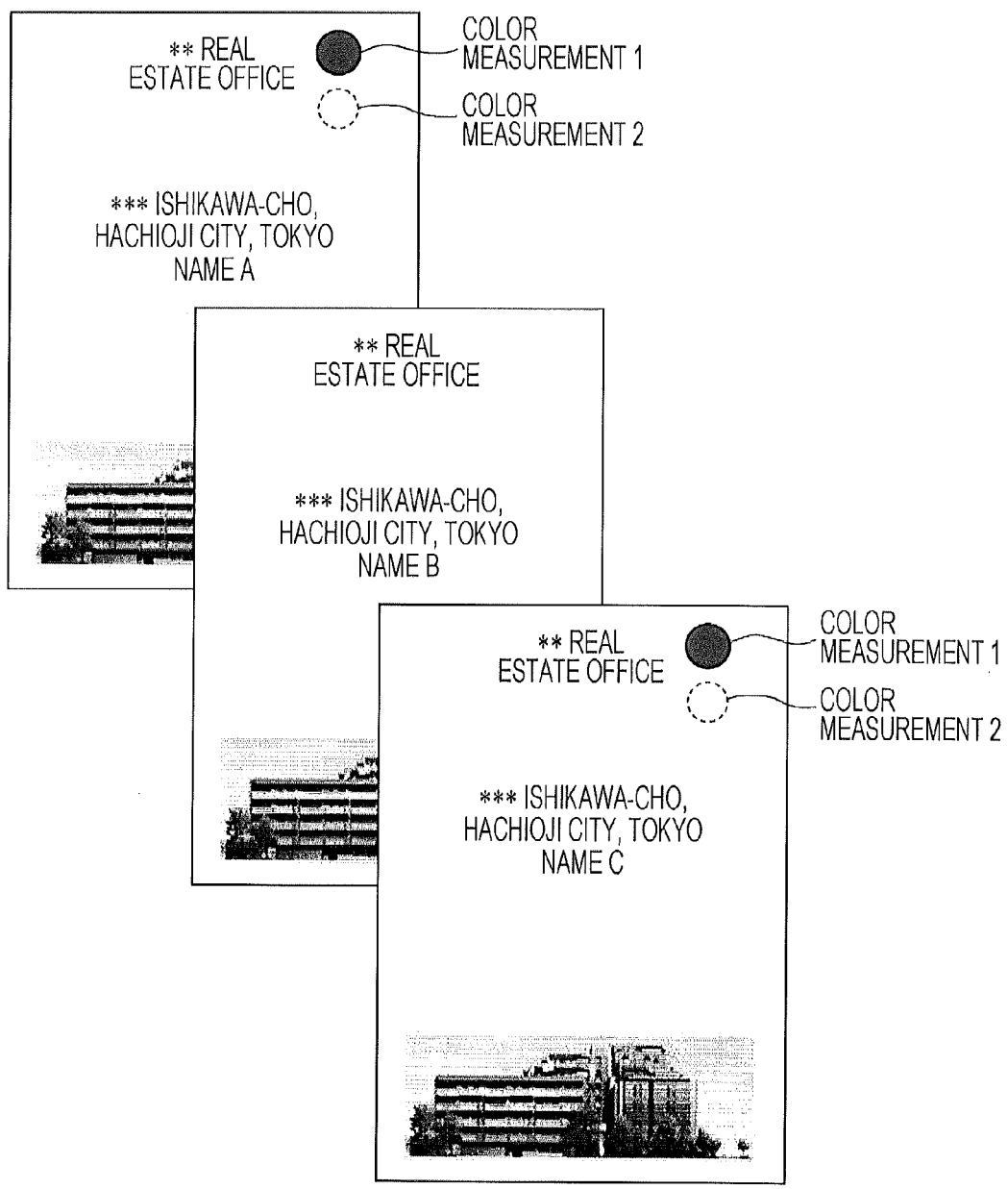
FIG. 28 is an output example of 1 to 3 pages of the printing job.

Next, a specific example will be described with reference to FIGS. 27 to 29.

FIG. 27 illustrates an execution example of a printing job. One printing job #001 is a job of 10,000 pages, and includes images of the special colors A, C, E, G, and H as the special colors. Further, the printer device values applied to the special colors are indicated in the drawing as a reference.

Since the setting of the color measurement is ON in the 1st, 3rd, 9997th, and 9999th pages, the control unit 2 detects the special color position information and an arrangement position of white paper data (corresponding to a non-image forming region where the printer device values are NULL or zero) based on the printing data, and performs the color measurement with respect to an object region by the color measurement unit 5 based on the detected information. FIG. 28 is an output example of the 1st to 3rd pages. The control unit 2 performs the color measurement of the output image (a circular mark in FIG. 28) of the special color and the white paper region around the output image, with respect to the 1st and 3rd pages (color measurement 1 and color measurement 2 in FIG. 28). With the color measurement of a white region, the color information of a white paper itself can be obtained.

FIG. 29 is an example of obtained color measurement results. As illustrated in FIG. 29, the color measurement unit 5 has performed the color measurement of the special color A and the white paper region of the sheet 1. Results thereof are converted into the printer device values with the LUT, and are stored in the HDD 23 as a history. In FIG. 29, the L*a*b* values are indicated as the color measurement results as a reference. Note that the table as illustrated in FIGS. 20 and 22 may be updated based on the color measurement result illustrated in FIG. 29.

Figure 30:
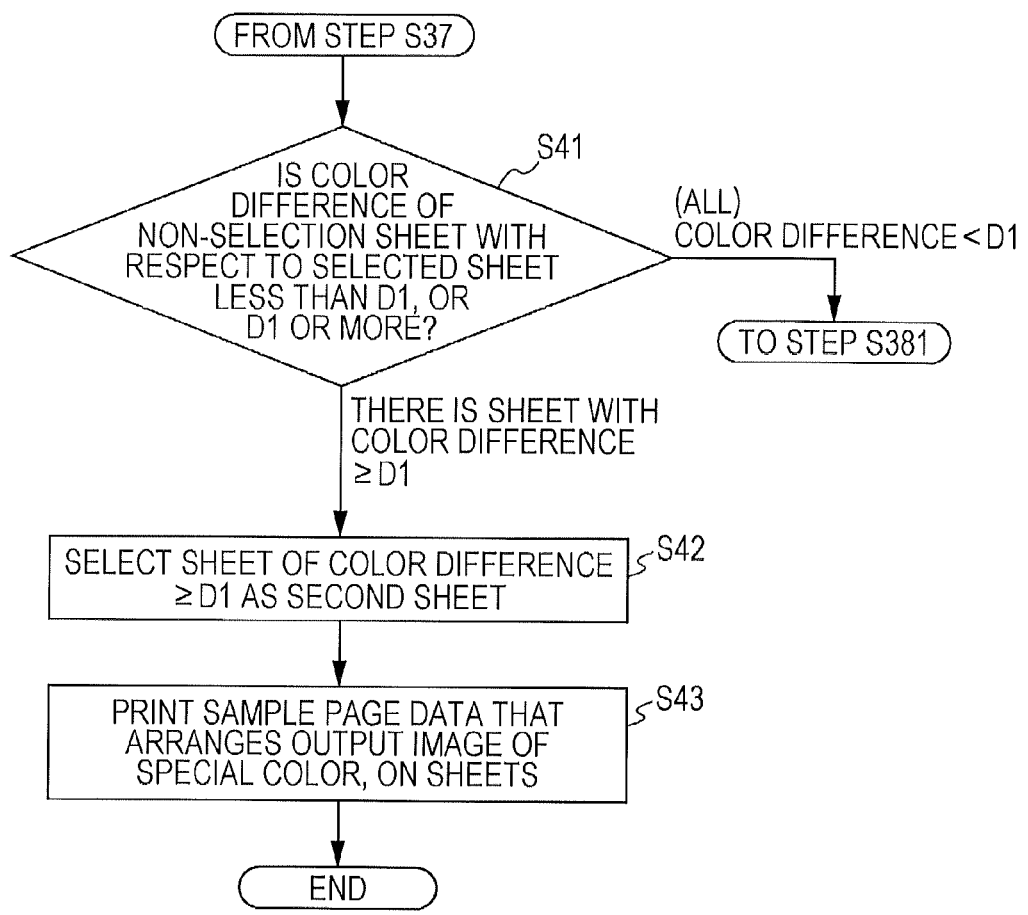
FIG. 30 is a diagram illustrating a control flow relates to the creation of the sample page executed by the control unit in the second embodiment.

FIG. 30 is a diagram illustrating a control flow of creation of a sample page executed by a control unit 2 in another embodiment.

FIG. 30 illustrates a flow of step S37 and subsequent steps of FIG. 24. A flow except the flow illustrated in the drawing is similar to the embodiment described in FIG. 24 and the like, and description is omitted.

At step S41 of FIG. 30, the control unit 2 calculates a color difference of another type of a sheet with respect to a type of a sheet closest to color information of a standard paper (recommended paper) selected at step S37, based on color information of the sheet acquired at step S34, and determines whether the color difference is less than a first threshold D1, or the first threshold D1 or more.

When the color difference (of all of types, if there are a plurality of other types of sheets) is less than the first threshold D1, the control unit 2 executes step S381 and subsequent steps of FIG. 24, and prints sample page data that arranges first and second images as illustrated in FIG. 25, and terminates the processing.

Meanwhile, when a type of a shoot having the color difference of the first threshold D1 or more is included, the control unit 2 selects the sheet as a second sheet at step S42.

At following step S43, the control unit 2 performs printing of a sample page using the selected type of a sheet. To be specific, the control unit 2 performs printing of at least two sheets of the sample page. On one sheet, the control unit 2 prints the sample page using the second sheet, on which an output image of a special color is arranged. A sheet simulation image is not arranged on the second sheet, and a white paper region (a region on which no toners are attached) exists around the output image of the special color. On the other sheet, one of (1) and (2) sample pages is printed depending on a situation. (1): when there is no another type of a sheet having the color difference of being less than the first threshold D1, the control unit 2 outputs the sample page obtained such that an output image of the special color, and on which a sheet simulation image similar to the first sheet is not arranged is arranged on the sheet of step S37. This output is in a similar form to the sample page output at step S36. (2): when there is the another type of a sheet having the color difference of being less than the first threshold D1, the control unit 2 creates the sample page in which a sheet simulation image corresponding to the color information of the sheet is formed, as illustrated in FIG. 25.

Note that a value of the first threshold D1 may be stored in the HDD 23 in advance, or may be set by the user.

In the present embodiment, with respect to the types of sheets selected at step S37, the sheet simulation image is not formed for the another type of a sheet having a too large color difference, and the output image of the special color is formed on different sheets, whereby the sample page can be easily output, which enables comparison and determination of the special color in consideration of the difference of the colors of the sheets used for printing.

Figure 31:
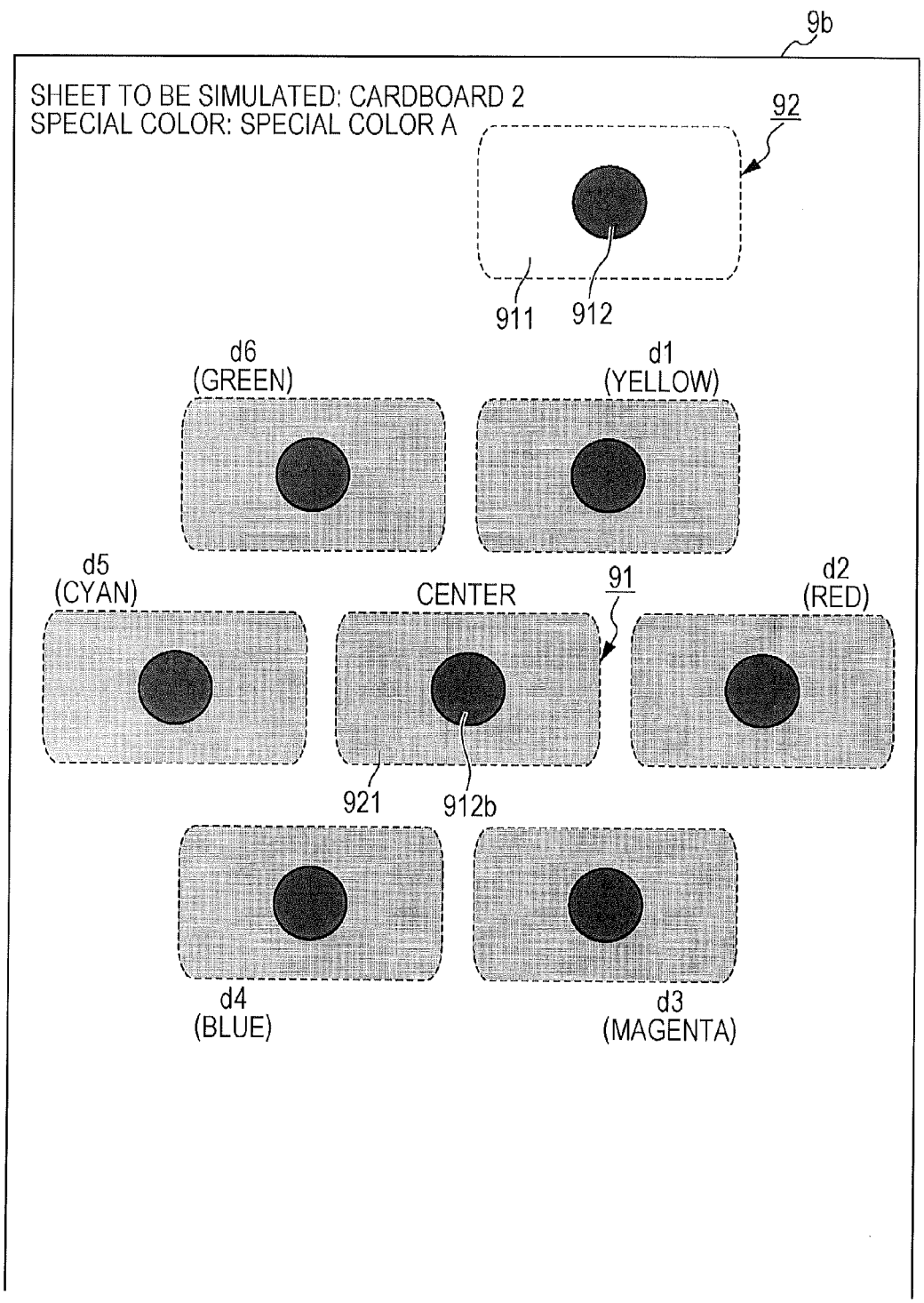
FIG. 31 is an example of a sample page 9b on which a color sample for color adjustment is formed.

FIG. 31 illustrates a sample page 9b on which color samples for color adjustment in the another embodiment are formed. On the sample page 9b, a first image 91 and a second image 92 similar to the sample page illustrated in FIG. 25, and in addition, six color sample images d1 to d6 are arranged to surround the first image 91. Circles formed in the centers of the color sample images d1 to d6 are images obtained such that the printer device values of the output image of the special color are changed bit by bit with respect to the output image 912b of the first image 91, and the same image as a sheet simulation image 921 of the first image 91 is formed around the circles.

Arrangement directions of the color sample images d1 to d6 with respect to the first image 91 respectively correspond to Y, R, M, B, C, and G color directions on an a*b* plane in an L*a*b* space, and the color sample images in which a*b* are changed bit by bit corresponding to the color directions are formed. The user selects and specifies a most appropriate color from among the color sample images d1 to d6, thereby to correct the special color (special color A) with respect to an object sheet (a cardboard 2) to which sheet simulation has been performed. For example, when the user determines that a color, a color tone of which is changed to the color sample image d1 (in an yellow direction), is favorable, the user inputs d1, which is a number corresponding to the color sample image, through a specifying screen (not illustrated) displayed in a control unit/display unit 1, thereby to update the printer device values in a special color table related to the sheet to which the sheet simulation has been performed, as illustrated in FIG. 20. Following that, the control unit 2 performs control to form an image using the updated printer device values.

According to an embodiment of the present invention, in the method of creating a sample page according to the present invention, when the creation conditions of the sample page is determined to be satisfied, the sample page having the first color sample image and the second color sample image formed on the recording medium is created, the first color sample image being according to the printer device value calculated based on the history color measurement result of the special color, and the second color sample image being according to the printer device values calculated based on the original color information of the special color, whereby the change of the color tone of the special color can be easily visually compared, and the color determination of the special color can be more effectively performed. Further, when the different types of sheets stored in the sheet storage trays are used for the same special color, the sample page in which the first image and the second image are arranged is created on the selected type of a sheet, the first image having the output image of the special color, and the second image having the sheet simulation image that is a reproduction of a color of another type of a sheet, and the output image of the special color formed in a region of the sheet simulation image, whereby the special color can be easily compared and determined in consideration of the difference of the colors of the sheets.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A method of creating a sample page in an image system including
    a special color setting unit configured to determine whether a special color is included in print data, and to set printer device values of the special color using a special color table in which identification information of the special color and printer device values indicating density signals of basic colors are associated when the special color is included in the print data,
    an image forming unit to form a color image on a recording medium based on the printer device values,
    a colorimeter configured to perform color measurement of an output image formed on the recording medium by the image forming unit to acquire color information, and
    a color conversion unit configured to calculate the printer device values indicating density signals of basic colors from the color information,
    the method comprising:
    a step of holding a color measurement result of the colorimeter, with respect to the output image of the special color, as a history color measurement result;
    a step of determining whether a creation condition of the sample page is satisfied; and
    a step of creating the sample page having a first color sample image and a second color sample image formed on the recording medium, the first color sample image being according to the printer device values calculated based on the history color measurement result of the special color, and the second color sample image being according to the printer device values of the special color determined from the special color table, when the creation condition of the sample page is determined to be satisfied.

2. The method of creating a sample page according to claim 1, wherein,
    on the sample page,
    the history color measurement result of the special color, and a color difference between the history color measurement result and original color information of the special color are indicated, with respect to the first color sample image.

3. The method of creating a sample page according to claim 1, wherein,
    on the sample page,
    estimated color information with respect to the second color sample image, and a color difference between the estimated color information and original color information of the special color are indicated, with respect to the second color sample image.

4. The method of creating a sample page according to claim 1, wherein
    the step of holding a history further holds the printer device values applied to the output image subjected to the color measurement, and
    on the sample page,
    the held printer device values are indicated, with respect to the first color sample image, and
    the printer device values applied to the second color sample image are indicated, with respect to the second color sample image.

5. The method of creating a sample page according to claim 1, wherein the color conversion unit includes a look up table used when calculating the printer device values based on the color information, and the method includes a step of updating the look up table after executing the step of holding a history and before executing the step of creating the sample page, and in the step of creating the sample page, the color conversion unit determines the printer device values of the first color sample image using the updated look up table.

6. The method of creating a sample page according to claim 1, wherein the method includes a step of outputting a plurality of patch images having differentiated printer device values, for reproduction of the history color measurement result, and acquiring a corresponding relationship between the printer device values and the color information from a color measurement result of the outputted patch images, after, executing the step of holding a history, and before executing the step of creating the sample page, and in the step of creating the sample page, the color conversion unit determines the printer device values of the first color sample image from the acquired corresponding relationship.

7. The method of creating a sample page according to claim 1, wherein the creation condition of the sample page is at least one of (1) every time a predetermined number of sheets printed is exceeded, (2) when a color difference between original color information of the special color and the output image of the special color exceeds a predetermined value, and (3) when a color difference between the history color measurement result and the output image of the special color exceeds a predetermined value.

8. The method of creating a sample page according to claim 7, wherein, when one print job including an output of the special color is executed, the creation condition of the sample page is further intended for the sample print job, and the history color measurement result is a result of the color measurement with respect to the output image of a first special color in the print job.

9. The method of creating a sample page according to claim 1, wherein the step of holding a history further holds an output condition of at least either one of printing setting of a print, and ambient temperature and humidity at a time of the print, and on the sample page, the held output condition is indicated, with respect to the first color sample image.

10. The method of creating a sample page according to claim 1, wherein original color information of the special color is outside a color gamut that the image forming unit is able to reproduce with the color image formed on the recording medium.

11. A non-transitory recording medium storing a computer readable program for causing an image system to create a sample page, the image system including a special color setting unit configured to determine whether a special color is included in print data, and to set printer device values of the special color using a special color table in which identification information of the special color and printer device values indicating density signals of basic colors are associated when the special color is included in the print data, an image forming unit configured to form a color image on a recording medium based on the printer device values, a colorimeter configured to perform color measurement of an output image formed on the recording medium by the image forming unit to acquire color information, and a color conversion unit configured to calculate the printer device values indicating density signals of basic colors from the color information, the program for causing a computer to execute:

a step of holding a color measurement result of the colorimeter, with respect to the output image of the special color, as a history color measurement result;

a step of determining whether a creation condition of the sample page is satisfied; and a step of creating the sample page having a first color sample image and a second color sample image formed on the recording medium, the first color sample image being according to the printer device values calculated based on the history color measurement result of the special color, and the second color sample image being according to the printer device values of the special color determined from the special color table, when the creation condition of the sample page is determined to be satisfied.

12. The non-transitory recording medium storing a computer readable program according to claim 11, wherein, on the sample page, the history color measurement result of the special color, and a color difference between the history color measurement result and original color information of the special color are indicated, with respect to the first color sample image.

13. A method of creating a sample page in an image forming system including:

a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the method comprising:

a step of determining whether different types of sheets supplied from the paper feeding conveyance unit are used with respect to the same special color in one printing job;

a step of acquiring the color information of each of the sheets when the different types of sheets are determined to be used;

a step of selecting any type of a sheet based on the acquired color information; and a step of creating the sample page in which a first image and a second image are arranged, on the sheet selected at the step of selecting a sheet, the first image having an output image of the special color, and the second image having a sheet simulation image that is a reproduction of a color of another type of a sheet, and the output image of the special color formed in a region of the sheet simulation image.

14. The method of creating a sample page according to claim 13, the image forming system holds color information of a standard paper, as a reference value, and the step of selecting a sheet selects a sheet having a smallest color difference with respect to the reference value.

15. The method of creating a sample page according to claim 14, wherein the step of selecting a sheet further calculates color differences of other types of sheets with respect to the selected sheet, and when there is a sheet having the color difference larger than a first threshold, selects the sheet, as a second sheet, and the step of creating the sample page creates a first sample page having a first image and a second image arranged on the first sheet, the first image having the output image of the special color, and the second image having a sheet simulation image that is a reproduction of a color of another type of a sheet having the first threshold or less, and other than the first sheet, and the output image of the special color formed in a region of the sheet simulation image, and creates a second sample page having the output image of the special color formed on the second sheet.

16. The method of creating a sample page according to claim 13, wherein the image forming system includes a colorimeter that performs color measurement of the sheet on which an image is formed by the image forming unit, and the step of acquiring the color information of each of the sheets acquires a color measurement result of the color measurement of a non-image forming region on the sheet, performed by the colorimeter, as the color information.

17. The method of creating a sample page according to claim 13, wherein the image forming system stores a table in which a name of a type of a sheet and the color information are associated, and the step of acquiring the color information of each of the sheets acquires the color information of the sheet from the name of a type associated with the storage tray using the table.

18. A method of creating a sample page in an image forming system including:

a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the method comprising:

a step of determining whether different types of sheets supplied from the paper feeding conveyance unit are used with respect to the same special color in one printing job;

a step of acquiring the color information of each of the sheets when the different types of sheets are determined to be used;

a step of comparing a color difference between sheets calculated based on the acquired color information, with a first threshold;

a step of selecting either one of the types of sheets when the color difference is less than the first threshold, and creating the sample page in which a first image and a second image are arranged, on the selected sheet, the first image having an output image of the special color, and the second image having a sheet simulation image that is a reproduction of a color of another type of a sheet, and the output image of the special color formed in a region of the sheet simulation image; and a step of creating the sample page in which the output image of the special color is formed, on each of the sheets, when the color difference is the first threshold or more.

19. The method of creating a sample page according to claim 18, wherein the image forming system includes a colorimeter that performs color measurement of the sheet on which an image is formed by the image forming unit, and the step of acquiring the color information of each of the sheets acquires a color measurement result of the color measurement of a non-image forming region on the sheet, performed by the colorimeter, as the color information.

20. The method of creating a sample page according to claim 18, wherein the image forming system stores a table in which a name of a type of a sheet and the color information are associated, and the step of acquiring the color information of each of the sheets acquires the color information of the sheet from the name of a type associated with the storage tray using the table.

21. A non-transitory recording medium storing a computer readable program for causing an image forming system to create a sample page, the image forming system including:

a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an image forming unit configured to form a color image on a sheet supplied from the paper feeding conveyance unit, based on the print data, the program for causing a computer to execute:

a step of determining whether different types of sheets supplied from the paper feeding conveyance unit are used with respect to the same special color in one printing job;

a step of acquiring the color information of each of the sheets when the different types of sheets are determined to be used;

a step of selecting any type of a sheet based on the acquired color information; and a step of creating the sample page in which a first image and a second image are arranged, on the sheet selected at the step of selecting a sheet, the first image having an output image of the special color, and the second image having a sheet simulation image that is a reproduction of a color of another type of a sheet, and the output image of the special color formed in a region of the sheet simulation image.

22. A non-transitory recording medium storing a computer readable program for causing an image forming system to create a sample page, the image forming system including:

a paper feeding conveyance unit including a plurality of sheet storage trays, a special color setting unit configured to determine whether a special color is included in print data, and to set color information of a pixel corresponding to the special color using a special color table in which identification information of the special color and color information are associated, when the special color is included in the print data, and an imago forming unit configured to form a color image on a sheet supplied from the paper feeding conveyance unit, based on the print data, the program for causing a computer to execute:

a step of determining whether different types of sheets supplied from the paper feeding conveyance unit are used with respect to the same special color in one printing job;

a step of acquiring the color information of each of the sheets when the different types of sheets are determined to be used;

a step of comparing a color difference between sheets calculated based on the acquired color information, with a first threshold;

a step of selecting either one of the types of sheets when the color difference is less than the first threshold, and creating the sample page in which a first image and a second image are arranged, on the selected sheet, the first image having an output image of the special color, and the second image having a sheet simulation image that is a reproduction of a color of another type of a sheet, and the output image of the special color formed in a region of the sheet simulation image; and a step of creating the sample page in which the output image of the special color is formed, on each of the sheets, when the color difference is the first threshold or more.

* * * * *